US007515562B2

(12) United States Patent
Lim et al.

(10) Patent No.: US 7,515,562 B2
(45) Date of Patent: Apr. 7, 2009

(54) APPARATUS AND METHOD FOR SUPPORTING SOFT HANDOVER IN BROADBAND WIRELESS ACCESS COMMUNICATION SYSTEM

(75) Inventors: Chi-Woo Lim, Suwon-si (KR); Pan-Yuh Joo, Yongin-si (KR); Sie-Joon Cho, Seongnam-si (KR); Jae-Weon Cho, Suwon-si (KR); Young-Bin Chang, Seoul (KR)

(73) Assignee: Samsung Electronics Co., Ltd (KR)

( * ) Notice: Subject to any disclaimer, the term of this patent is extended or adjusted under 35 U.S.C. 154(b) by 679 days.

(21) Appl. No.: 11/174,828

(22) Filed: Jul. 5, 2005

(65) Prior Publication Data
US 2006/0009224 A1   Jan. 12, 2006

(30) Foreign Application Priority Data
Jul. 2, 2004   (KR) ...................... 10-2004-0051466

(51) Int. Cl.
*H04B 3/00* (2006.01)
(52) U.S. Cl. ........................ 370/331; 370/332; 370/333; 370/335; 370/342
(58) Field of Classification Search .................. 370/331, 370/332, 333, 335, 342
See application file for complete search history.

(56) References Cited

U.S. PATENT DOCUMENTS

| 6,038,450 | A | 3/2000 | Brink et al. | |
|---|---|---|---|---|
| 7,042,858 | B1 * | 5/2006 | Ma et al. | 370/331 |
| 2006/0215607 | A1 * | 9/2006 | Mitchel et al. | 370/331 |
| 2007/0274253 | A1 * | 11/2007 | Zhang et al. | 370/328 |

FOREIGN PATENT DOCUMENTS

| KR | 1020040030083 | 4/2004 |
|---|---|---|
| KR | 1020040039348 | 5/2004 |
| KR | 1020050079856 | 8/2005 |
| WO | WO 03/081938 | 10/2003 |

* cited by examiner

*Primary Examiner*—Alexander Eisen
*Assistant Examiner*—Julio R Perez
(74) *Attorney, Agent, or Firm*—The Farrell Law Firm, PC

(57) ABSTRACT

Disclosed is an apparatus and method for allocating downlink/uplink subchannels for a soft handover in a broadband wireless access communication system, wherein the method includes the steps of configuring FUSC subchannels based on a predetermined FUSC subchannel configuration scheme by using an equal seed value in all cells; allocating a predetermined number of FUSC subchannels of the configured FUSC subchannels as soft handover subchannels; and allocating remaining subchannels, except for the FUSC subchannels allocated as the first subchannels, as non-soft handover subchannels based on the FUSC subchannel configuration scheme by using a specific seed value.

10 Claims, 9 Drawing Sheets

APPARATUS AND METHOD FOR SUPPORTING SOFT HANDOVER IN BROADBAND WIRELESS ACCESS COMMUNICATION SYSTEM

PRIORITY

This application claims to the benefit under 35 U.S.C. 119(a) of an application entitled "Apparatus And Method For Supporting Soft Handover In Broadband Wireless Access Communication System" filed in the Korean Intellectual Property Office on Jul. 2, 2004 and assigned Serial No. 2004-51466, the entire contents of which are incorporated herein by reference.

BACKGROUND OF THE INVENTION

1. Field of the Invention

The present invention relates to a broadband wireless access communication system, and more particularly to an apparatus and method for supporting a soft handover in a communication system (hereinafter, referred to as an "OFDMA communication system") employing an orthogonal frequency division multiple access (OFDMA) scheme.

2. Description of the Related Art

Fourth generation (4 G) communication systems (the next generation communication systems) are being designed to provide users with services having various qualities of service (QoS) with a high transmission speed. Particularly, in current 4 G communication systems, research is actively being conducted to develop a new type of communication system for ensuring mobility and QoS in a broadband wireless access (BWA) communication system, such as a wireless local area network (LAN) and a wireless metropolitan area network (MAN) system, in order to support a high speed service. The representative communication systems are the IEEE (Institute of Electrical and Electronics Engineers) 802.16a communication system and the IEEE 802.16e communication system.

The IEEE 802.16a and the IEEE 802.16e communication systems employ an orthogonal frequency division multiplexing/orthogonal frequency division multiple access (OFDM/OFDMA) scheme in order to enable a physical channel of the wireless MAN system to support a broadband transmission network. The IEEE 802.16a communication system considers only a single cell structure and stationary subscriber stations (SSs), which means the system does not in any way reflect mobility of the SSs at all. In contrast, the IEEE 802.16e communication system is defined as a system reflecting mobility of an SS in addition to the other features of the IEEE 802.16a communication system.

In the following description, an SS having mobility will be called a mobile station (MS).

FIG. 1 is a block diagram schematically illustrating a cell structure of a typical IEEE 802.16e communication system.

The IEEE 802.16e communication system has a multi-cell structure, that is, has a cell 100 and a cell 150. In addition, the IEEE 802.16e communication system includes a base station (BS) 110 controlling the cell 100, a base station (BS) 140 controlling the cell 150, and a plurality of MSs 111, 113, 130, 151 and 153. The transmission/reception of signals between the base stations 110 and 140 and the MSs 111, 113, 130, 151 and 153 is executed according to the OFDM/OFDMA scheme.

From among the MSs 111, 113, 130, 151 and 153, the MS 130 is located in a cell boundary area, i.e., handover zone, between the cell 100 and the cell 150. That is, when the MS 130 moves to the cell 150 managed by the base station 140 while transmitting/receiving signals with the base station 110, the serving base station of the MS 130 changes from the base station 110 to the base station 140. Accordingly, only when a handover for the MS 130 is supported, it is possible to support the mobility of the MS 130.

As described above, the IEEE 802.16e system supports a handover for an MS, but supports only a handover according to a hard handover scheme. According to the hard handover scheme, when an MS performs a hard handover, the MS terminates all connections to its serving base station currently providing service before establishing a new connection to another base station, i.e. to a target base station, desired to newly receive service.

In the IEEE 802.16e communication system, when the intensity, i.e. the carrier-to-interference-and-noise ratio (CINR), of a signal received from a current serving base station decreases to such a degree that it is impossible to maintain communication with the current serving base station, the MS performs a handover to a neighbor base station (i.e., target base station) different from the current serving base station according to a request of the MS or current serving base station.

However, while the MS is performing a handover operation to the target base station in the IEEE 802.16e communication system, if the CINR of a signal received from the target base station decreases to such a degree that it is impossible to receive a desired service from the target base station, the MS may change its connection to the serving base station. For example, a signal blocking phenomenon, i.e., shadowing, may occur due to obstructions on the wireless channel. Because of the shadowing as described above, when the MS passes through a cell boundary area, or in other words, when the MS is located in a handover zone, a phenomenon may occur in which the CINR of a signal received from the target base station becomes higher and then lower than that of a signal received from the serving base station occurs. If handover were determined to be initialized at a time point at which the intensity of a signal received from the target base station becomes equal to that of a signal received from the serving base station, the handover would occur multiple times while the MS is passing through the cell boundary area. Such a phenomenon is called a 'ping-pong effect'. When the ping-pong effect occurs, handover signaling greatly increases, so that the probability of handover failure also increases.

FIG. 2 shows a ping-pong effect occurring according to the performance of the conventional hard handover when an MS moves from a first base station (BS 1) to a second base station (BS 2). To be specific, FIG. 2 shows a graph for illustrating the intensities of signals received from the first and second base stations to the MS when the MS is located in a handover zone, which is a service coverage area overlapped by the first and second base stations. In the following description for convenience, it is assumed that the first base station is the serving base station of the MS and the second base station is the target base station of the MS.

Referring to FIG. 2, when the MS moves from the serving base station (i.e., the first base station) to the target base station (i.e., the second base station), a handover is executed at three time points in total, i.e., at time points 'A1', 'A2' and 'A3'. This is because it is assumed that the typical IEEE 802.16e communication system performs a hard handover, and that the hard handover is performed at a time point at which the CINR of a signal received from the target base station becomes equal to that of a signal received from the serving base station. The occurrence of the ping-pong effect, which necessarily causes the frequent handover of an MS located in a handover zone, increases the service delay and the signaling load due to the multiple handovers, thereby deteriorating the performance of the entire system.

In order to solve the ping-pong effect which is problematic of the hard handover, a handover parameter (e.g., a hysteresis margin) may be used. In other words, while the MS moves from the serving base station to the target base station, a handover is performed only when the intensity of a signal received from the target base station is greater by the hysteresis margin than that of the signal received from the serving base station. When the hysteresis margin is used as described above, it is possible to prevent unnecessary handover operations caused by the ping-pong effect.

However, when the hysteresis margin is used, a handover is performed not in the handover zone but at a location near to the target base station, i.e., at a location near to the target base station from a cell boundary. Therefore, as compared with the case in which the hysteresis margin is not used, the intensity of a signal received from the serving base station at the cell boundary may be very poor.

In FIG. 2, when the hysteresis margin 'H' is used and set at 'H', the MS performs a handover only once at time point 'B'. However, when the hysteresis margin is used, the CINR of a signal received from the serving base station is smaller than that when the hysteresis margin is not used. Accordingly, since the CINR of a signal received from the serving base station becomes poor when the hysteresis margin is used, the connection between the MS and the serving base station may be cut off before the MS completes a handover to the target base station.

In order to solve the problem of the hard handover, as described above, a soft handover scheme has been proposed. The soft handover scheme is a communication technique, wherein the MS establishes a connection to the target base station before ending a connection to the serving base station, so that the MS simultaneously establishes connection with and receives service from two base stations (i.e., the serving base station and target base station) in a predetermined cell boundary area, i.e., in a handover zone.

When the soft handover is performed in a downlink, the serving base station and the target base station transmit the same data to one MS through wireless channels occupying the same frequency band at the same time point. Also, when the soft handover is performed in an uplink, both the serving base station and target base station receive a signal transmitted from the MS. Therefore, when the soft handover scheme is employed, it is possible to simultaneously solve both the ping-pong effect, which is problematic in the hard handover, and the phenomenon of decreasing the CINR of a received signal at a cell boundary. In addition, when the soft handover is employed, the MS receives the same data (i.e., the MS is allocated with wireless channels at the same time) from the two base stations in a downlink, so that the CINR of a received signal can be improved. Also, since the serving base station and target base station simultaneously receive a signal transmitted from one MS in an uplink, it is possible to improve the quality of the uplink by applying a macro diversity scheme to two signals received in the serving base station and target base station.

However, although the soft handover has the above-mentioned advantage, a difficulty lies in applying the soft handover as it is without changing the current standardized subchannel allocation scheme in the typical IEEE 802.16e communication system. That is, in order to provide the soft handover scheme, two adjacent base stations (e.g., a serving base station and a target base station) adjacent to an MS performing a soft handover must simultaneously allocate the same subchannel including the same sub-carriers to the MS. Herein, the subchannel represents a channel including at least one sub-carrier, and sub-carriers included in the subchannel may or may not be adjacent to each other in the frequency domain.

FIG. 3 is a diagram for schematically illustrating the frame structure of a typical IEEE 802.16e communication system. The frame includes a downlink frame 300 and an uplink frame 350. The downlink frame 300 includes a preamble area 310, a broadcasting control area and a data transmission area. The broadcasting control area includes a downlink MAP and uplink MAP (DL-MAP/UL-MAP) area 320. The data transmission area may be classified into a partial-usage-of-subchannels (PUSC) area 330 and a full-usage-of-subchannels (FUSC) area 340. The PUSC area and the FUSC area may be distinguished by time division in the same frame. Also, the uplink frame 350 includes an FUSC area 360 and a PUSC area 370.

A synchronization signal (e.g., a preamble sequence) for acquiring synchronization between a transmitter and a receiver (i.e., between a base station and an MS) is transmitted through the preamble area 310. A DL-MAP message and a UL-MAP message are transmitted through the DL-MAP and UL-MAP area 320. Herein, information elements (IEs) included in the DL-MAP and UL-MAP messages have no direct relation with the present invention, so description thereof will be omitted.

The PUSC areas 330 and 370 represent data burst areas constituting subchannels based on a PUSC scheme, and the FUSC areas 340 and 360 represent data burst areas constituting subchannels based on an FUSC scheme. The PUSC scheme and the FUSC scheme will now be described.

According to the FUSC scheme, all sectors of all cells allocate and use whole subchannels. When the FUSC scheme is employed, the frequency reuse factor becomes "1". However, when the FUSC scheme is employed, although all sectors can use all of the subchannels, a distinct set of sub-carriers configuring a subchannel is established for each sector. That is, the FUSC subchannels are designed to minimize a hit probability between sub-carriers contained in subchannels. It is necessary to allocate the same subchannel having the same sub-carriers to two sectors in order to provide the soft handover, but it is impossible to provide such subchannel allocation by using the current FUSC subchannel.

According to the PUSC scheme, each sector allocates and uses only a part of subchannels of the whole subchannels. When the PUSC scheme is employed, the frequency reuse factor becomes larger than "1". Therefore, PUSC subchannels different from each other are allocated to the sectors of two adjacent cells so as to remove inter-sector interference. However, it is difficult for two base stations to allocate a PUSC subchannel having the same sub-carrier to an MS located at a cell boundary.

The current IEEE 802.16e communication system has been proposed only for a first subchannel configuration scheme (hereinafter, referred to as a 'FUSC subchannel configuration scheme') for supporting the FUSC scheme and a second subchannel configuration scheme (hereinafter, referred to as a 'PUSC subchannel configuration scheme') for supporting the PUSC scheme, but does not provide a distinct subchannel configuration scheme for supporting the soft handover scheme.

The following description will be given with respect to performing the soft handover without changing the FUSC subchannel configuration scheme proposed in the current IEEE 802.16e communication system, that is, by using subchannels (hereinafter, referred to as 'FUSC subchannels')

allocated according to the FUSC subchannel configuration scheme proposed in the current IEEE 802.16e communication system.

First, base stations included in an active set establish specific all cell identifications (IDs) of the base stations as the same value, and then configure FUSC subchannels according to a predetermined FUSC subchannel configuration scheme. Then, it is necessary to allocate a corresponding number of FUSC subchannels from among the configured FUSC subchannels as subchannels for the soft handover in order to support the soft handover scheme. For example, all the base stations included in the active set establish their specific cell IDs as 'zero' to configure the FUSC subchannels.

However, when the FUSC subchannels configured in the above-mentioned way is intactly allocated, not to an MS performing a soft handover but to normal MSs, all sub-carriers configuring each of the FUSC subchannels become equal to each other in all the base stations included in the active set, so that large interference between the FUSC subchannels is caused.

Two schemes for downlink and two schemes for uplink in connection with the FUSC subchannel configuration scheme have been proposed in the current IEEE 802.16e communication system. The FUSC subchannel configuration schemes are defined by permutation and include first to fourth FUSC subchannel configuration schemes, which will now be described.

The first FUSC subchannel configuration scheme refers to a downlink FUSC subchannel configuration scheme, which may be expressed as Equation 1.

$$\text{subcarrier}(k,s)=N_{subch}*n_k+\{P_s[n_k \bmod N_{subch}]+ \text{ID}_{cell}\} \bmod N_{subch} \quad (1)$$

In Equation 1, 'subcarrier (k,s)' represents the sub-carrier index of a $k^{th}$ sub-carrier in a $s^{th}$ FUSC subchannel, '$N_{subch}$' represents the number of FUSC subchannels, '$ID_{cell}$' represents a cell ID for a corresponding cell, and '$p_s[i]$' represents the value of an $i^{th}$ element (i=0, 1, 2, ..., $N_{subch}$-1) obtained through an 's' time leftward cyclic-shift of 'p', in which the 'p' is expressed as shown in Equation 2. Herein, it is assumed that the number '$N_{subch}$' of subchannels is '32'.

$$p=\{3,18,2,8,16,10,11,15,26,22,6,9,27,20,25,1,29,7 \\ 21,5,28,31,23,17,4,24,0,13,12,19,14,30\} \quad (2)$$

Also, '$n_k$' shown in equation 1 may be expressed as Equation 3.

$$n_k=(k+13s) \bmod N_{tones} \quad (3)$$

In Equation 3, '$N_{tones}$' represents the number of sub-carriers configuring one FUSC subchannel, which is assumed to be '48' herein.

Consequently, according to the first FUSC subchannel configuration scheme, all cells configure FUSC subchannels different from each other by using their own specific cell IDs as shown in Equation 1.

The second FUSC subchannel configuration scheme refers to a downlink FUSC subchannel configuration scheme, which may be expressed as Equation 4.

$$\text{subcarrier}(m, s) = \quad (4)$$

$$\begin{cases} N^*_{subch}k + s \oplus P_{1,c1}(k') \oplus P_{2,c2}(k') & 0 < c_1, c_2 < N_{subch} \\ N^*_{subch}k + s \oplus P_{1,c1}(k') & c_1 \neq 0, c_2 = 0 \\ N^*_{subch}k + s \oplus P_{2,c2}(k') & c_1 = 0, c_2 \neq 0 \\ 32k + s & c_1 = 0, c_2 = 0 \end{cases}$$

In Equation 4, k'=k mod($N_{subch}$-1), $c_1$=$ID_{cell}$ mod $N_{subch}$, and $$c2 = \left\lfloor \frac{ID_{cell}}{N_{subch}} \right\rfloor.$$

Also, '⊕' represents an exclusive OR operator, '$p_{1,c1}[i]$' represents the value of an $i^{th}$ element (i=0, 1, 2, ..., $N_{subch}$-2) obtained through a 'c1' time leftward cyclic-shift of '$p_1$', and '$p_{2,c2}[i]$' represents the value of an $i^{th}$ element (i=0, 1, 2, ..., $N_{subch}$-2) obtained through a 'c2' times leftward cyclic-shift of '$p_2$', in which the '$p_1$' and '$p_2$' are expressed as shown in Equations 5 and 6.

$$p_1=\{1,2,4,8,16,5,10,20,13,26,17,7,14,28,29,31, 27,19, \\ 3,6,12,24,21,15,30,25,23,11,22,9,18\} \quad (5)$$

$$p_2=\{1,4,16,10,13,17,14,29,27,3,12,21,30,23,22, 18,2, \\ 8,5,20,26,7,28,31,19,6,24,15,25,11,9\} \quad (6)$$

The third FUSC subchannel configuration scheme refers to an uplink FUSC subchannel configuration scheme, which may be expressed as Equation 7.

$$\text{tile}(n,s)=N_{subch}*n+\{p[(s+n) \bmod N_{subch}]+ \\ UL\_ID_{cell}\} \bmod N_{subch} \quad (7)$$

In Equation 7, 'tile(n,s)' represents an $n^{th}$ tile index of an $s^{th}$ subchannel, and 'n' is a tile index of '0' to '5'. 's' represents a subchannel number. '$UL\_ID_{cell}$' represents the total number of subchannels available for uplink, which is determined in a MAC layer and has integer values of '0' to '69'. '$N_{subch}$' represents the number of FUSC subchannels, which is assumed as '70'. Herein, the 'tile' includes a predetermined number of consecutive sub-carriers. 'p' shown in Equation 7 may be expressed as shown in Equation 8.

$$p=\{6,48,58,57,50,1,13,26,46,44,30,3,27,53,22,18,61, \\ 7, 55,36,45,37,52,15,40,2,20,4,34,31,10,5,41,9, \\ 69,63,21,11, 12,19,68,56,43,23,25,39,66,42,16, \\ 47,51,8,62,14,33,24,32,17, 54,29,67,49,65,35,38, \\ 59,64,28,60,0\} \quad (8)$$

The fourth FUSC subchannel configuration scheme refers to an uplink FUSC subchannel configuration scheme, which may be expressed as Equation 9.

$$\text{tile}(m, s) = \begin{cases} 3N_t^*m + N_tS + s' \oplus P_{1,c1}[m'] \oplus P_{2,c2}[m'] & 0 < c_1, c_2 < N_t \\ 3N_t^*m + N_tS + s' \oplus P_{1,c1}[m'] & c_1 \neq 0, c_2 = 0 \\ 3N_t^*m + N_tS + s' \oplus P_{2,c2}[m'] & c_1 = 0, c_2 \neq 0 \\ 3N_t^*m + N_tS + s' & c_1 = 0, c_2 = 0 \end{cases} \quad (9)$$

In Equation 9, '$N_t$' represents the number of tiles included in one group, in which the '$N_t$' is assumed as '32' and has a relation of '$N_{subch}$=$3N_t$'. The 's' (s=0,1,2, ..., $3N_t$-1) represents a subchannel index, and 'm' (m=0,1,2, ..., 5) represents an $m^{th}$ tile included in one subchannel. In addition, $$m' = m \bmod (N_t - 1), S = \left\lfloor \frac{s}{N_t} \right\rfloor, s' = s \bmod (N_t),$$

$$c_1 = ID_{cell} \bmod N_t, \text{ and } c_2 = \left\lfloor \frac{ID_{cell}}{N_t} \right\rfloor.$$

Also, in Equation 9, '$p_{1,c1}[i]$' represents the value of an $i^{th}$ element (i=0, 1, 2, ..., 30) obtained through a 'c1' times leftward cyclic-shift of '$p_1$', and '$p_{2,c2}[i]$' represents the value of an $i^{th}$ element (i=0, 1, 2, ..., 30) obtained through a 'c2' times leftward cyclic-shift of 'p$_2$', in which the 'p$_1$' and 'p$_2$' are expressed as shown in the Equations 5 and 6.

According to the first to fourth FUSC subchannel configuration schemes described above, different cells have FUSC subchannels including different sub-carriers.

As described above, in order to support the soft handover scheme, two adjacent cells (i.e., a serving base station and a target base station) must be able to allocate the same subchannel including the same sub-carriers. However, according to the current IEEE 802.16e communication system, when the above-mentioned first to fourth FUSC subchannel configuration schemes are employed, MSs not performing soft handovers cannot normally communicate due to interference between FUSC subchannels. Accordingly, it is necessary to develop a subchannel configuration capable of minimizing mutual interference as well as supporting a soft handover, and a method for transmitting/receiving a subchannel signal according to the configuration.

SUMMARY OF THE INVENTION

Accordingly, the present invention has been made to solve the above-mentioned problems occurring in the prior art, and an object of the present invention is to provide an apparatus and method capable of supporting a soft handover in an orthogonal frequency division multiple access (OFDMA) communication system.

Another object of the present invention is to provide an apparatus and method for allocating subchannels in an OFDMA communication system.

Still another object of the present invention is to provide an apparatus and method for allocating uplink/downlink subchannels, which can support a soft handover, in an OFDMA communication system.

To accomplish these objects, in accordance with one aspect of the present invention, there is provided a method for allocating a subchannel for a soft handover in a broadband wireless access communication system, the method including the steps of configuring full-usage-of-subchannels (FUSC) subchannels based on a predetermined FUSC subchannel configuration scheme by using an equal seed value in all cells; allocating a predetermined number of FUSC subchannels of the configured FUSC subchannels as first subchannels; and allocating remaining subchannels, except for the FUSC subchannels allocated as the first subchannels, as second subchannels based on the FUSC subchannel configuration scheme by using a specific seed value.

In accordance with another aspect of the present invention, there is provided a method for allocating a subchannel for a soft handover in a broadband wireless access (BWA) communication system, the method including the steps of configuring an equal full-usage-of-subchannels (FUSC) subchannel and then determining a required number of soft handover subchannels in all base stations of the BWA communication system; renumbering the sub-carriers of the remaining subchannels except for the determined number of soft handover subchannels; and re-configuring an FUSC subchannel including different sub-carriers according to base stations by using a specific cell identification corresponding each base station and the renumbered sub-carriers, wherein each base station allocates the predetermined soft handover subchannel for a soft handover to a mobile station requesting the soft handover, and allocates the re-configured FUSC subchannel to a mobile station not requesting a soft handover.

In accordance with still another aspect of the present invention, there is provided a method for configuring a subchannel in a broadband wireless access (BWA) communication system, which includes a plurality of cells distinguished by cell identifications and has an entire frequency band divided into a plurality of sub-carrier bands, the method including the steps of generating a plurality of subchannels based on a predetermined subchannel configuration scheme in each of the cells included in the communication system; determining a predetermined number of subchannels from among the generated subchannels as soft handover subchannels; renumbering indexes of sub-carrier bands included in remaining subchannels except for the subchannels determined as the soft handover subchannels; and generating a plurality of non-soft handover subchannels including different sub-carrier bands depending on the cells, by using a specific cell identification of each cell and the renumbered indexes of sub-carrier bands.

In accordance with still another aspect of the present invention, there is provided an apparatus for allocating a subchannel for a soft handover in a broadband wireless access (BWA) communication system, the apparatus including a subchannel/subcarrier allocator for receiving a control signal from an upper layer and controlling the selection of downlink/uplink full-usage-of-subchannels (FUSC) subchannels to be allocated to a corresponding mobile station, wherein the subchannel/subcarrier allocator configures FUSC subchannels based on a predetermined FUSC subchannel configuration scheme by using an equal seed value in all cells; allocates a predetermined number of FUSC subchannels of the configured FUSC subchannels as first subchannels; and allocates remaining subchannels, except for the FUSC subchannels allocated as the first subchannels, as second subchannels based on the FUSC subchannel configuration scheme by using a specific seed value.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
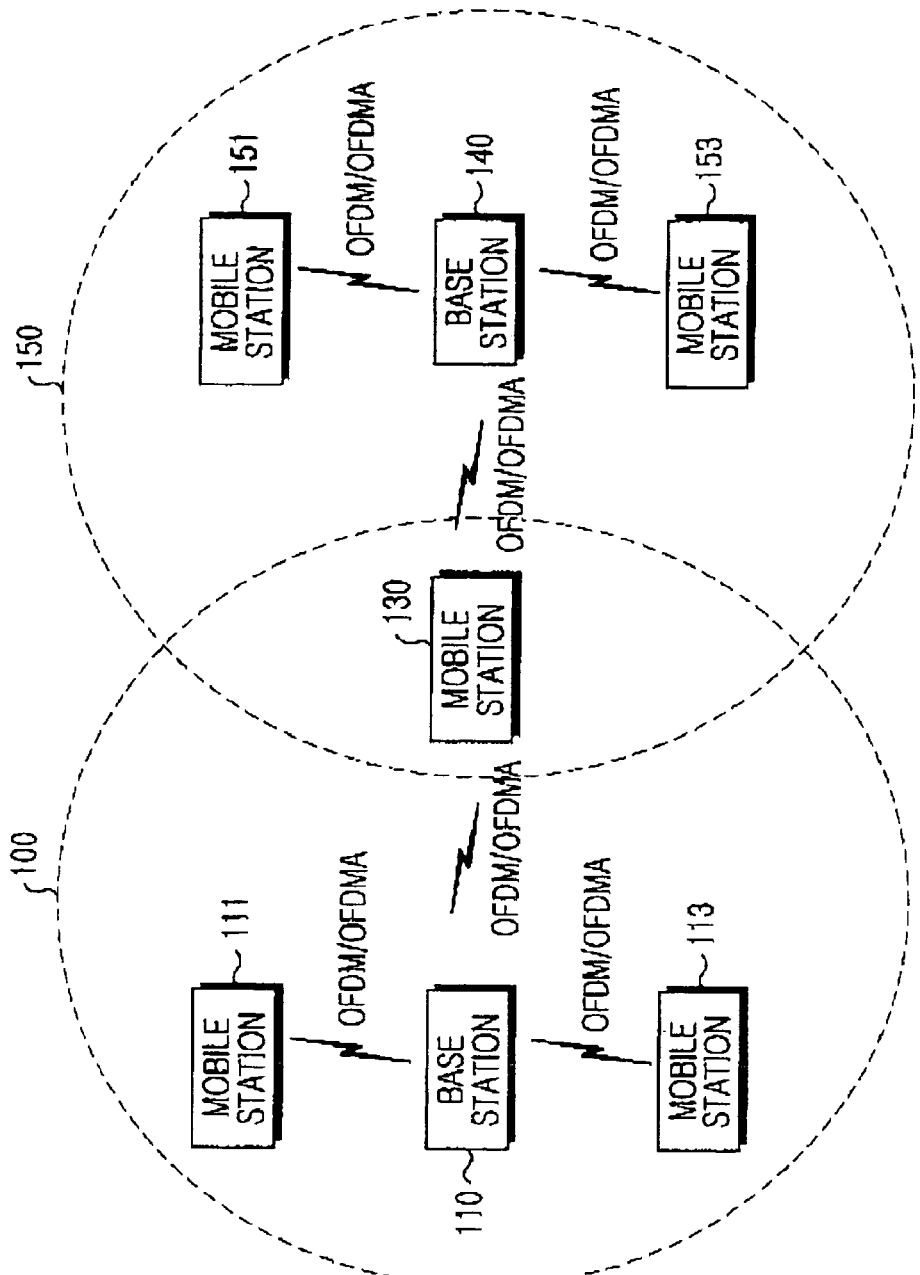
FIG. 1 is a block diagram illustrating a cell structure of a typical broadband wireless access communication system.
Figure 2:
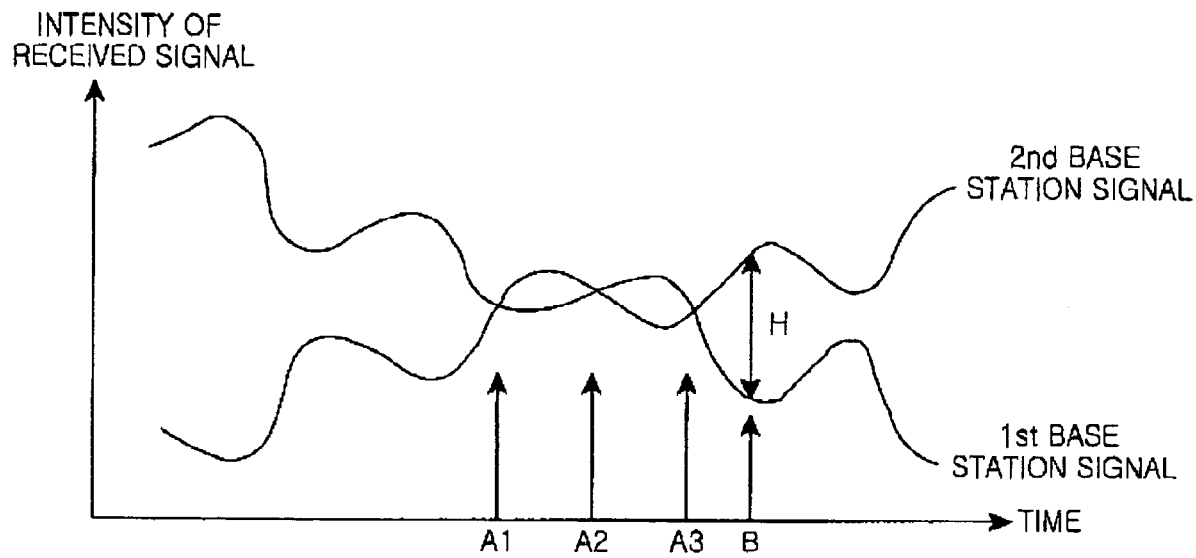
FIG. 2 is a graph for explaining a ping-pong effect occurring in the typical broadband wireless access communication system.
Figure 3:
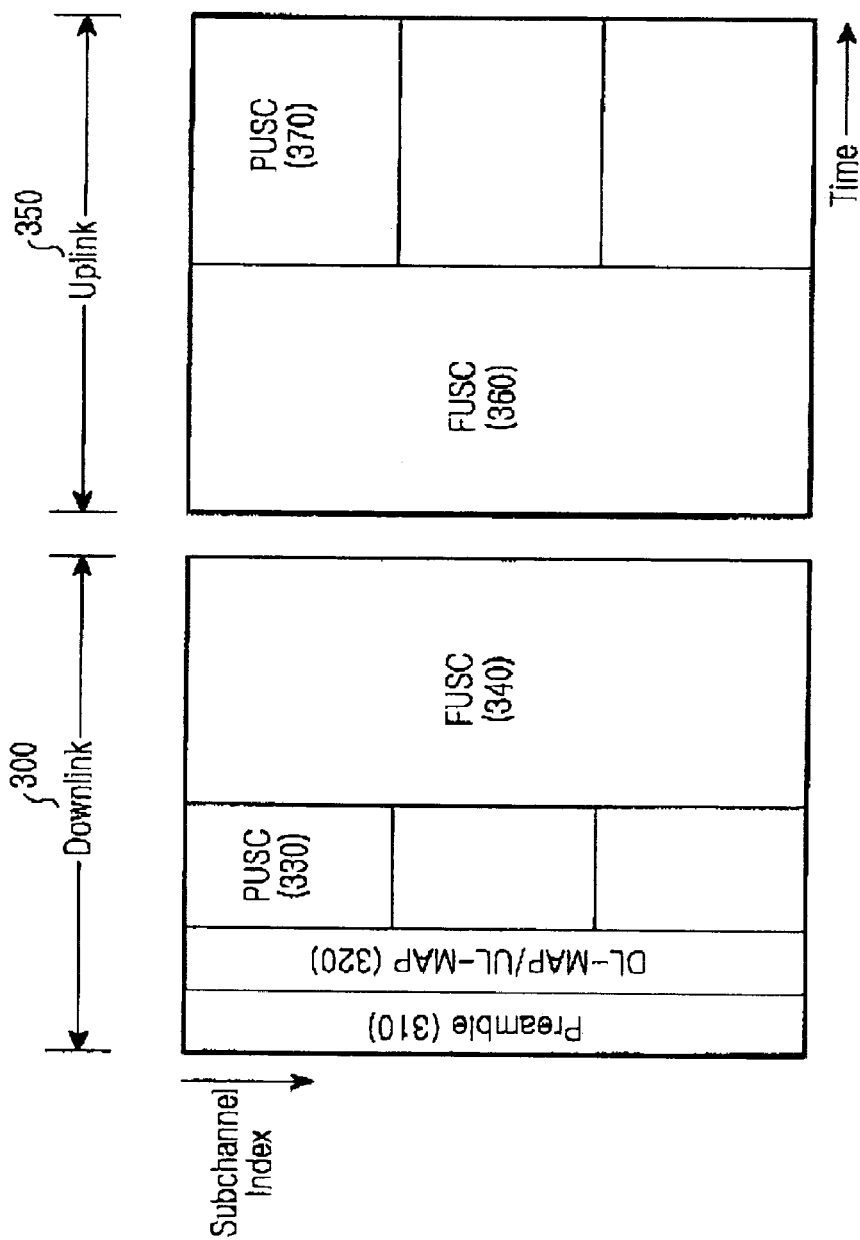
FIG. 3 is a diagram for illustrating the frame structure of a typical broadband wireless access communication system.

Hereinafter, preferred embodiments according to the present invention will be described with reference to the accompanying drawings. In the following description of the embodiments of the present invention, a detailed description of known functions and configurations incorporated herein will be omitted when it may obscure the subject matter of the present invention.

The present invention provides an apparatus and method for providing a soft handover in a communication system (hereinafter, referred to as an "OFDMA communication system") employing an orthogonal frequency division multiple access (OFDMA) scheme. Particularly, the present invention provides a subchannel signal transmission/reception apparatus and method for supporting the soft handover.

To be specific, the present invention provides a subchannel transmission/reception apparatus and method for supporting the soft handover in an OFDMA communication system which has the frequency reuse factor of '1', that is, which employs a full-usage-of-subchannels (FUSC) scheme.

According to the present invention, in order to support a soft handover, subchannels are configured by using the FUSC scheme. In the following description, a subchannel configured by using the FUSC scheme will be called a 'FUSC subchannel'.

According to an embodiment of the present invention, the FUSC subchannels are classified into 'soft handover subchannels' and 'non-soft handover subchannels', in which the 'soft handover subchannels' are allocated to a mobile stations (MSs) to support a soft handover and the 'non-soft handover subchannels' are allocated MSs to support the non-soft handover. Herein, the subchannel refers to a channel including at least one sub-carrier, and sub-carriers included in the subchannel may or may not be adjacent to each other in the frequency domain.

That is, according to the present invention, permutations determining sub-carriers to constitute a subchannel in all cell, which constitute an IEEE 802.16e communication system that is an OFDMA communication system, have the same seed value, so that FUSC subchannels are configured as subchannels including the same sub-carriers. For example, the value of cell identification (ID) may be used as the seed value. All cells set their cell IDs as '0' and configure FUSC subchannels by using permutations which determine sub-carriers to constitute a subchannel.

In other words, according to an embodiment of the present invention, all cells configure the FUSC subchannels by employing a predetermined FUSC subchannel configuration scheme with the same seed value (e.g., the same cell ID). Thereafter, from among FUSC subchannels configured according to the above-mentioned way, a predetermined number of FUSC subchannels are allocated as the soft handover subchannels. Herein, the same cell ID is set as an equal value used in all base stations (for example, which may be 'zero'). It is recognized that the number of FUSC subchannels allocated as the soft handover subchannels may change depending on the circumstances of the IEEE 802.16e communication system.

Next, each of the cells in the IEEE 802.16e communication system applies the FUSC subchannel configuration scheme to the remaining sub-carriers (except for the sub-carriers constituting the FUSC subchannels allocated as the soft handover subchannels), by using a specifically-set seed value (i.e., using a cell ID specifically-set to each cell), thereby configuring new FUSC subchannels, i.e., non-soft handover subchannels.

A soft handover subchannel allocation procedure according to an embodiment of the present invention will be described with reference to FIG. 4.

Also, according to embodiments of the present invention, the FUSC subchannel configuration schemes includes two schemes for uplink and two schemes for downlink, each of which is configured using permutations which are employed as needed.

For example, in the case using Equation 1, when the cell IDs for all cells are set as '0' and an FUSC subchannel is configured using permutation, all the cells have the same FUSC subchannel. Such a procedure may also be applied to the Equations 4, 7 and 9. When all the cells have the same FUSC subchannels established through such a procedure, a required number of soft handover subchannels is determined. Next, when the required number of soft handover subchannels is determined, renumbering is performed for the sub-carriers of the remaining subchannels except for the determined number of soft handover subchannels. Thereafter, FUSC subchannels including different sub-carriers are configured once more using a specific seed value of each cell, e.g., using each cell ID. In this case, the number of FUSC subchannels decreases by the required number of soft handover subchannels.

Next, each serving base station allocates an MS desiring a handover with a subchannel predetermined for a soft handover. In addition, because a corresponding target base station has the same subchannel allocated for the same handover, the target base station can transmit the same information as described above through the subchannel, so that the MS can perform a soft handover.

The FUSC subchannels newly-configured by a specific cell ID may be used for MSs requesting non-soft handover. Accordingly, MSs requesting non-soft handovers receive little interference from an adjacent cell.

Hereinafter, embodiments of the present invention for realizing the above-mentioned functions will be described in detail with reference to the accompanying drawings.

Figure 4:
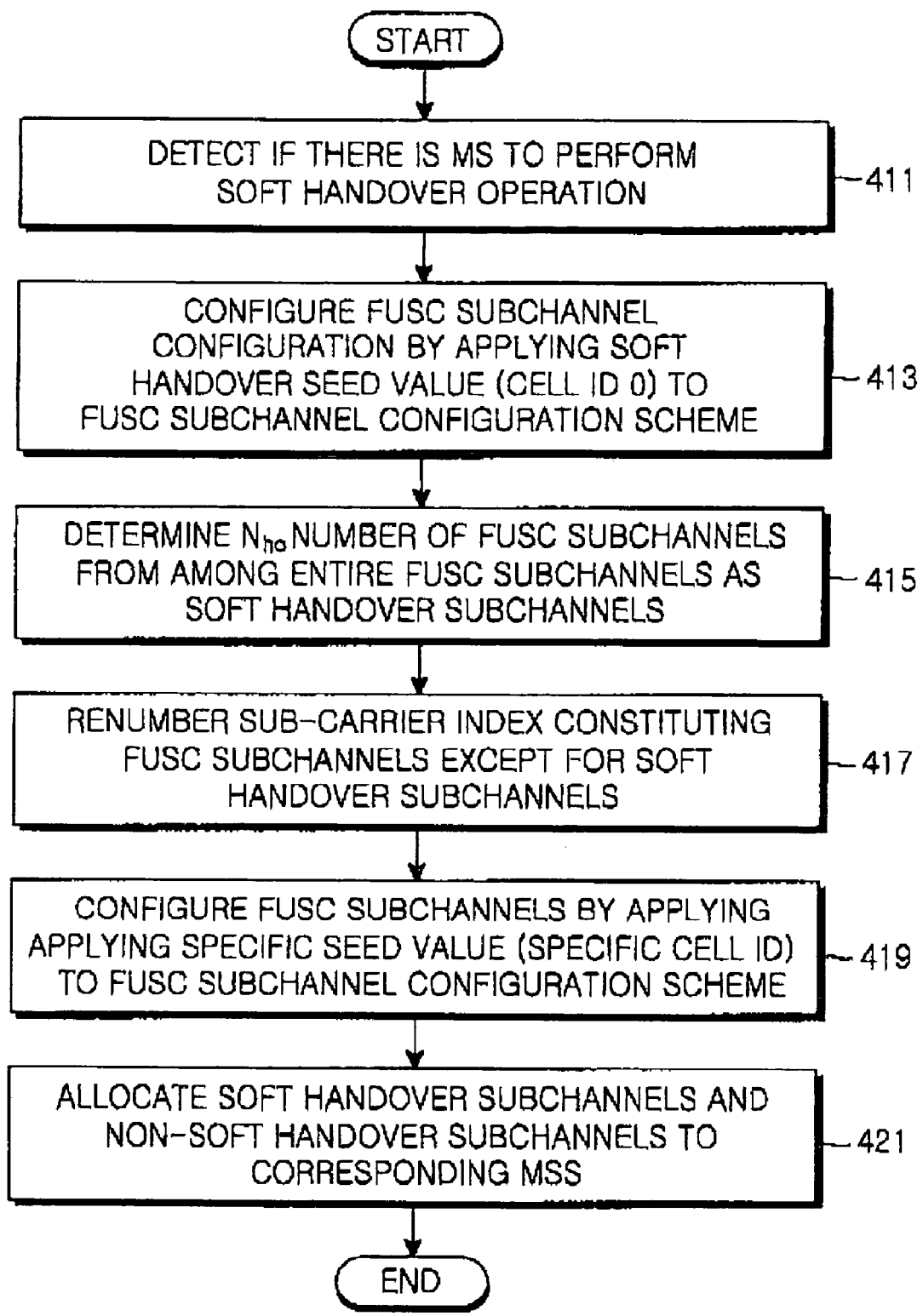
FIG. 4 is a flowchart for explaining a procedure for allocating soft handover subchannels in a broadband wireless access communication system according to an embodiment of the present invention.

FIG. 4 is a flowchart for explaining a procedure for allocating soft handover subchannels in an IEEE 802.16e communication system according to an embodiment of the present invention.

In this embodiment, the operation of only one base station from among a plurality of base stations, which are located in an active set of an MS performing a soft handover will be described for convenience of description. However, it should be noted that all the base stations located in the active set perform the same operation as described below with reference to FIG. 4.

Referring to FIG. 4, in step 411, the base station detects that an MS to perform a soft handover exists in a cell, to which the base station provide service, and then proceeds to step 413. Herein, the base station can detect if there is an MS to perform a soft handover operation by receiving a mobile station handover request (MOB_MSHO-REQ) message or the like from the MS. The operation for detecting if there is an MS to perform a soft handover operation has no direct relation with the present invention, so detailed description thereof will be omitted.

In step 413, the base station configures FUSC subchannels by applying a seed value (i.e., a predetermined cell ID '0') predetermined for a soft handover subchannel configuration to a predetermined FUSC subchannel configuration scheme, and then proceeds to step 415. The seed value predetermined for the soft handover subchannel configuration will be referred to as a 'soft handover seed value', and the soft handover seed value is determined as an equal value in all the base stations included in the active set. The FUSC subchannel configuration scheme will be described later.

In step 415, the base station determines a predetermined $N_{ho}$ number of FUSC subchannels, from among FUSC subchannels configured based on the FUSC subchannel configuration scheme, as soft handover subchannels, and then proceeds to step 417. Herein, the number '$N_{ho}$' of the soft handover subchannels may be either a predetermined number in the IEEE 802.16e communication system or a variable number depending on the system circumstances in the IEEE 802.16e communication system. In this case, a number of subchannels corresponding to the number of the determined soft handover subchannels are reserved for MSs desiring to a handover.

In step 417, the base station renumbers sub-carrier indexes of sub-carriers constituting the remaining FUSC subchannels, except for the '$N_{ho}$' number of soft handover subchannels, to map the renumbered sub-carrier indexes as new indexes, and then proceeds to step 419. In step 419, the base station configures FUSC subchannels by applying a seed value (i.e., a specific cell ID), determined specifically for the base station to the FUSC subchannel configuration scheme (by using the renumbered sub-carriers) and then proceeds to step 421. Herein, the FUSC subchannels configured in step 419 corresponds to non-soft handover FUSC subchannels.

In step 421, the base station allocates the configured soft handover FUSC subchannels and non-soft handover FUSC subchannels to the MSs requiring them, and then ends the procedure. That is, the base station allocates the soft handover FUSC subchannels reserved for the handover to the MSs performing a soft handover operation, allocates the non-soft handover FUSC subchannels to the MSs not performing soft handovers operation, and then ends the procedure.

In the above-mentioned method, permutations to configure FUSC subchannels by mapping sub-carriers to a subchannel include two schemes each for downlink and uplink. These schemes are generated by reflecting the required number '$N_{ho}$' of soft handover subchannels in an existing permutation. That is, equations described below according to embodiments of the present invention correspond to equations used in the prior art, respectively.

Hereinafter, the FUSC subchannel configuration schemes provided according to the above-mentioned present invention will be described in detail.

The present invention provides two schemes for downlink and two schemes for uplink for the FUSC subchannel configuration schemes. The FUSC subchannel configuration schemes are determined in permutation patterns, and include fifth to eighth FUSC subchannel configuration schemes.

The fifth to eighth FUSC subchannel configuration schemes refer to newly-configured schemes obtained by reflecting the number '$N_{ho}$' of the soft handover subchannels in the first to fourth FUSC subchannel configuration schemes described in the prior art.

The fifth FUSC subchannel configuration scheme refers to a downlink FUSC subchannel configuration scheme according to an embodiment of the present invention, which may be expressed as Equation 10.

$$\text{subcarrier}(k, s) = (N_{subch} - N_{ho})n_k + \{P_s[n_k \bmod (N_{subch} - N_{ho})] + ID_{cell}\} \bmod (N_{subch} - N_{ho}) \quad (10)$$

In Equation 10, the 'subcarrier (k,s)' represents the sub-carrier index of a $k^{th}$ sub-carrier in a $s^{th}$ FUSC subchannel, and the '$N_{subch}$' represents the number of FUSC subchannels, in which it is assumed that the number of FUSC subchannels is '32'. The '$ID_{cell}$' represents the cell ID for a corresponding cell, the '$N_{ho}$' represents a required number of soft handover subchannels, and the '$N_{tones}$' represents the number of sub-carriers for configuring one subchannel, in which it is assumed that the number '$N_{tones}$' of sub-carriers for configuring one subchannel is '48'. The '$n_k$' may be expressed as Equation 11.

$$n_k = (k+13s) \bmod N_{tones} \quad (11)$$

In Equation 10, '$p_s[i]$' represents the value of an $i^{th}$ element (i=0, 1, 2, . . . , $N_{subch-1}-N_{ho}$) obtained through an 's' times leftward cyclic-shift of $\tilde{p}$, in which the 'p' is expressed as shown in Equation 12.

$$p = \{3,18,2,8,16,10,11,15,26,22,6,9,27,20,25,1,29,7\\ 21,5,28,31,23,17,4,24,0,13,12,19,14,30\} \quad (12)$$

The $\tilde{P}$ is equal to 'p' shown in Equation 12 when the required number '$N_{ho}$' of soft handover subchannels is 'zero' ($N_{ho}=0$), and the $\tilde{p}$ corresponds to permutation obtained by removing elements corresponding to '$N_{subch}-N_{ho}$', '$N_{subch}+1-N_{ho}$', '$N_{subch}+2-N_{ho}$', . . . , and '$N_{subch}-1$' from among the elements included in the 'p' when the required number '$N_{ho}$' of soft handover subchannels exceeds 'zero' (i.e., $N_{ho}$ 1). The $\tilde{P}$ may be expressed as Equation 13.

$$\tilde{p} = \begin{cases} p & \text{if } N_{ho} = 0 \\ \begin{cases} x \mid x \in p, x \neq N_{subch} - (N_{ho} - i), \\ i = 0, 1, \ldots, N_{ho} - 1 \end{cases} & \text{if } N_{ho} \geq 1 \end{cases} \quad (13)$$

Consequently, it can be understood that, when the required number '$N_{ho}$' of soft handover subchannels is '0' in Equation 10, the fifth FUSC subchannel configuration scheme becomes equal to the first FUSC subchannel configuration scheme described with reference to Equation 1, as the existing art. That is, the fifth FUSC subchannel configuration scheme can support the soft handover subchannel configuration, newly-proposed by the present invention, while enabling the first FUSC subchannel configuration scheme employed in the typical IEEE 802.16e communication system to be applied.

the sixth FUSC subchannel configuration scheme refers to another downlink FUSC subchannel configuration scheme according to an embodiment of the present invention, which may be expressed as Equation 14.

$$\text{subcarrier}(m, s) = \quad (14)$$
$$\begin{cases} (N_{subch} - N_{ho})k + s \oplus P_{1,c1}(k') \oplus P_{2,c2}(k') & 0 < c_1, c_2 < (N_{subch} - N_{ho}) \\ (N_{subch} - N_{ho})k + s \oplus P_{1,c1}(k') & c_1 \neq 0, c_2 = 0 \\ (N_{subch} - N_{ho})k + s \oplus P_{2,c2}(k') & c_1 = 0, c_2 \neq 0 \\ 32k + s & c_1 = 0, c_2 = 0 \end{cases}$$

In Equation 14, k=m+23s mod ($N_{tones}$), k'=k mod ($N_{subch}-1$), $c_1 = ID_{cell}$ mod $N_{subch}$, and $$c_2 = \left\lfloor \frac{ID_{cell}}{N_{subch}} \right\rfloor.$$

Also, '$\oplus$' represents an exclusive OR operator, '$N_{subch}$' represents the number of FUSC subchannels, in which it is assumed that the number '$N_{subch}$' of FUSC subchannels is '32'. '$N_{tones}$' represents the number of sub-carriers for configuring one FUSC channel, in which it is assumed that the number '$N_{tones}$' of sub-carriers for configuring one FUSC channel is '48'. '$N_{ho}$' represents a required number of soft handover subchannels.

In addition, in Equation 14, '$p_{1,c1}[i]$' represents the value of an $i^{th}$ element (i=0, 1, 2, ..., $N_{subch}$-2-$N_{ho}$) obtained through a 'c1' times leftward cyclic-shift of '$p_1$', and '$p_{2,c2}[i]$' represents the value of an $i^{th}$ element (i=0, 1, 2, ..., $N_{subch}$-2-$N_{ho}$) obtained through a 'c2' times leftward cyclic-shift of '$p_2$', in which the '$p_1$' and '$p_2$' are defined as shown in Equations 15 and 16.

$$p_1 = \begin{cases} p_{1,base} & \text{if } N_{ho} = 0 \\ \left\{\begin{array}{l} x \mid x \in p_{1,base}, x \neq N_{subch} - (N_{ho} - i), \\ i = 0, 1, \ldots, N_{ho} - 1 \end{array}\right\} & \text{if } N_{ho} \geq 1 \end{cases} \quad (15)$$

$$p_2 = \begin{cases} p_{2,base} & \text{if } N_{ho} = 0 \\ \left\{\begin{array}{l} x \mid x \in p_{2,base}, x \neq N_{subch} - (N_{ho} - i), \\ i = 0, 1, \ldots, N_{ho} - 1 \end{array}\right\} & \text{if } N_{ho} \geq 1 \end{cases} \quad (16)$$

In Equations 15 and 16, '$P_{1,base}$' and '$P_{2,base}$' may be expressed as Equations 17 and 18.

$$p_1 = \{1,2,4,8,16,5,10,20,13,26,17,7,14,28,29,31, 27,19, 3,6,12,24,21,15,30,25,23,11,22,9,18\} \quad (17)$$

$$p_2 = \{1,4,16,10,13,17,14,29,27,3,12,21,30,23,22, 18,2, 8,5,20,26,7,28,31,19,6,24,15,25,11,9\} \quad (18)$$

Consequently, it can be understood that, when the required number '$N_{ho}$' of soft handover subchannels is '0' in Equation 14, the sixth FUSC subchannel configuration scheme becomes equal to the second FUSC subchannel configuration scheme described with reference to Equation 4, as the existing art. That is, the sixth FUSC subchannel configuration scheme can support the soft handover subchannel configuration, newly-proposed by the present invention, while enabling the second FUSC subchannel configuration scheme employed in the typical IEEE 802.16e communication system to be applied.

The seventh FUSC subchannel configuration scheme refers to an uplink FUSC subchannel configuration scheme according to an embodiment of the present invention, which may be expressed as Equation 19.

$$\text{tile}(n,s) = (N_{subch}-N_{ho})n + \{p[(s+n) \bmod (N_{subch}-N_{ho})] + UL_{cell}\} \bmod (N_{subch}-N_{ho}) \quad (19)$$

In Equation 19, 'tile(n,s)' represents an $n^{th}$ tile index of an $s^{th}$ subchannel, and 'n' is a tile index of '0' to '5'. 's' represents a subchannel number. '$UL_{cell}$' represents the total number of subchannels available for uplink, which is determined in a MAC layer and has integer values of '0' to '69'. '$N_{ho}$' represents a required number of soft handover subchannels, and '$N_{subch}$' represents the number of FUSC subchannels, which is assumed as '70'. Herein, the 'tile' includes a predetermined number of consecutive sub-carriers. Also, 'p' shown in Equation 19 may be expressed as Equation 20.

$$p = \begin{cases} p_0 & \text{if } N_{ho} = 0 \\ \left\{\begin{array}{l} x \mid x \in p_0, x \neq N_{subch} - (N_{ho} - i), \\ i = 0, 1, \ldots, N_{ho} - 1 \end{array}\right\} & \text{if } N_{ho} \geq 1 \end{cases} \quad (20)$$

In Equation 20, '$p_0$' may be expressed as Equation 21.

$$p_0 = \{6,48,58,57,50,1,13,26,46,44,30,3,27,53,22,18,61, \\ 7, 55,36,45,37,52,15,40,2,20,4,34,31,10,5,41,9, \\ 69,63,21,11, 12,19,68,56,43,23,25,39,66,42,16, \\ 47,51,8,62,14,33,24,32,17, 54,29,67,49,65,35,38, \\ 59,64,28,60,0\} \quad (21)$$

Consequently, it can be understood that, when the required number '$N_{ho}$' of soft handover subchannels is '0' in Equation 19, the seventh FUSC subchannel configuration scheme becomes equal to the third FUSC subchannel configuration scheme described with reference to Equation 7, as in the existing art. That is, the seventh FUSC subchannel configuration scheme can support the soft handover subchannel configuration newly-proposed by the present invention while enabling the third FUSC subchannel configuration scheme employed in the typical IEEE 802.16e communication system to be applied.

The eighth FUSC subchannel configuration scheme refers to another uplink FUSC subchannel configuration scheme according to an embodiment of the present invention, which may be expressed as Equation 22.

$$\text{tile}(m, s) = \begin{cases} (3N_t - N_{ho})m + N_t S + s' \oplus P_{1,c1}[m'] \oplus P_{2,c2}[m'] & 0 < c_1, c_2 < N_t \\ (3N_t - N_{ho})m + N_t S + s' \oplus P_{1,c1}[m'] & c_1 \neq 0, c_2 = 0 \\ (3N_t - N_{ho})m + N_t S + s' \oplus P_{2,c2}[m'] & c_1 = 0, c_2 \neq 0 \\ (3N_t - N_{ho})m + N_t S + s' & c_1 = 0, c_2 = 0 \end{cases} \quad (22)$$

In Equation 22, '$N_t$' represents the number of tiles included in one group, in which the '$N_t$' is assumed as '32' and the connection of '$N_{subch}$=3$N_t$' exists. 's' (s=0,1,2, ..., 3$N_t$-1) represents a subchannel index, and 'm' (m=0,1,2, ..., 5) represents an $m^{th}$ tile included in one subchannel. In addition, $$m' = m \bmod (N_t - 1), \quad S = \left\lfloor \frac{s}{N_t} \right\rfloor, \quad s' = s \bmod (N_t),$$

$$c_1 = ID_{cell} \bmod N_t, \text{ and } c_2 = \left\lfloor \frac{ID_{cell}}{N_t} \right\rfloor.$$

Also, in Equation 22, '$p_{1,c1}[i]$' represents the value of an $i^{th}$ element (i=0, 1, 2, ..., 30) obtained through a 'c1' times leftward cyclic-shift of '$p_1$', and '$p_{2,c2}[i]$' represents the value of an $i^{th}$ element (i=0, 1, 2, ..., 30) obtained through a 'c2' times leftward cyclic-shift of '$p_2$', in which the '$p_1$' and '$p_2$' are expressed as Equations 23 and 24.

$$p_1 = \begin{cases} p_{1,base} & \text{if } N_{ho} = 0 \\ \{x \mid x \in p_{1,base}, x \neq 32 - (N_{ho} - i), & \text{if } N_{ho} \geq 1 \\ i = 0, 1, \ldots, N_{ho} - 1\} \end{cases} \quad (23)$$

$$p_2 = \begin{cases} p_{2,base} & \text{if } N_{ho} = 0 \\ \{x \mid x \in p_{2,base}, x \neq 32 - (N_{ho} - i), & \text{if } N_{ho} \geq 1 \\ i = 0, 1, \ldots, N_{ho} - 1\} \end{cases} \quad (24)$$

In Equations 23 and 24, '$p_{1,base}$' and '$p_{2,base}$' are expressed as Equations 17 and 18 shown above.

Consequently, it can be understood that, when the required number '$N_{ho}$' of soft handover subchannels is '0' in Equation 22, the eighth FUSC subchannel configuration scheme becomes equal to the fourth FUSC subchannel configuration scheme described with reference to Equation 9, as in the existing art. That is, the eighth FUSC subchannel configuration scheme can support the soft handover subchannel configuration, newly-proposed by the present invention, while enabling the fourth FUSC subchannel configuration scheme employed in the typical IEEE 802.16e communication system to be applied.

Figure 5:
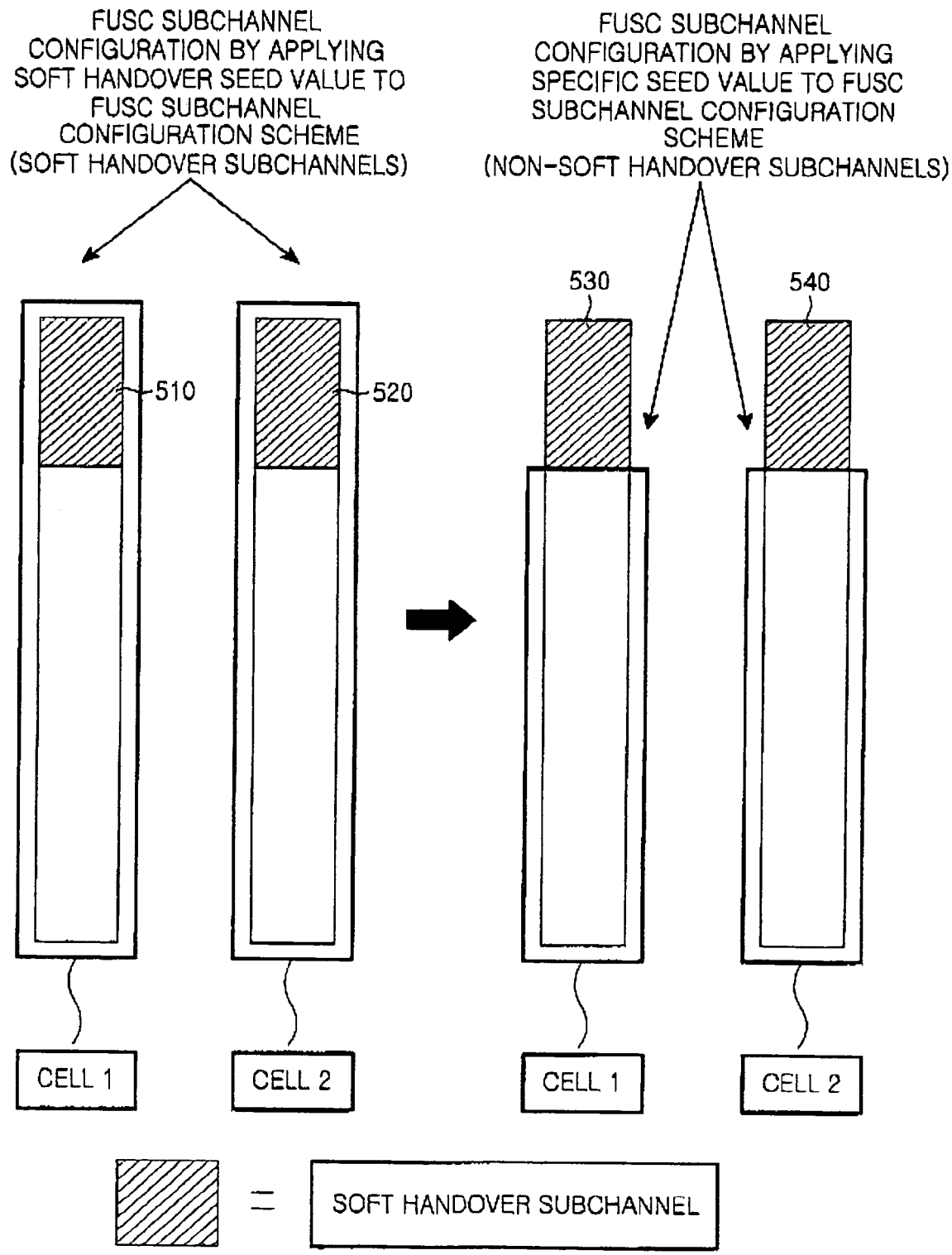
FIG. 5 is a diagram for explaining a method for allocating soft handover subchannels in a broadband wireless access communication system according to an embodiment of the present invention.

FIG. 5 is a diagram for explaining a method for allocating soft handover subchannels in an IEEE 802.16e communication system according to an embodiment of the present invention.

In this embodiment of FIG. 5, the equations described above according to the embodiments of the present invention are used in order to allocate a part of FUSC subchannels, from among the FUSC subchannels equally-configured for every cell, as subchannels for a soft handover and to use the remaining FUSC subchannels to configure distinct FUSC subchannels for each cell. In this case, each cell participating in a soft handover notifies a soft handover MS of information about the subchannels equally-allocated for a soft handover in all cells, through a predetermined MAP message.

FIG. 5 schematically shows FUSC subchannel configuration A, configured by applying a soft handover seed value to the FUSC subchannel configuration scheme, and FUSC subchannel configuration B, configured by applying a specific seed value to the FUSC subchannel configuration scheme. In this case, the FUSC subchannel configuration A includes soft handover subchannels in which cells #1 and #2 have the same permutation by using Equations 1, 4, 7 and 9, and the FUSC subchannel configuration B includes non-soft handover subchannels in which cells #1 and #2 have different permutations by using Equations 10, 14, 19 and 22. Also, the hatched portions indicated by reference numerals 510, 520, 530 and 540 represent subchannels required for a soft handover. Particularly, reference numerals 510 and 520 indicates soft handover subchannels, and reference numerals 530 and 540 indicates non-soft handover subchannels. As described above, relevant base stations (e.g., base stations included in an active set) select one FUSC subchannel configuration scheme for configuring soft handover subchannels, from among the fifth to eighth FUSC subchannel configuration schemes. The selected FUSC subchannel configuration scheme is used to configure FUSC subchannels for a soft handover. That is, in order to configure soft handover subchannels, the required number '$N_{ho}$' of soft handover subchannels is set as '0' ($N_{ho}$=0) in the selected FUSC subchannel configuration scheme. Next, the same seed value (i.e., a soft handover seed value) is applied to the selected FUSC subchannel configuration scheme to configure FUSC subchannels.

Thereafter, FUSC subchannels corresponding to the actually-required number '$N_{ho}$' of soft handover subchannels are selected from among the configured FUSC subchannels. Sub-carrier indexes of sub-carriers, which constitute the remaining subchannels except for the selected FUSC subchannels, are renumbered. After the renumbering of sub-carriers, the number '$N_{ho}$' of soft handover subchannels required in the selected FUSC subchannel configuration scheme is set as a proper value, i.e., a value of one or more ($N_{ho} \geq 1$). Next, FUSC subchannels are configured by applying a specific value (i.e., a specific cell ID) to the selected FUSC subchannel configuration scheme. In other words, the FUSC subchannels are configured by employing the specific cell ID established as non-soft handover subchannels.

Figure 6:
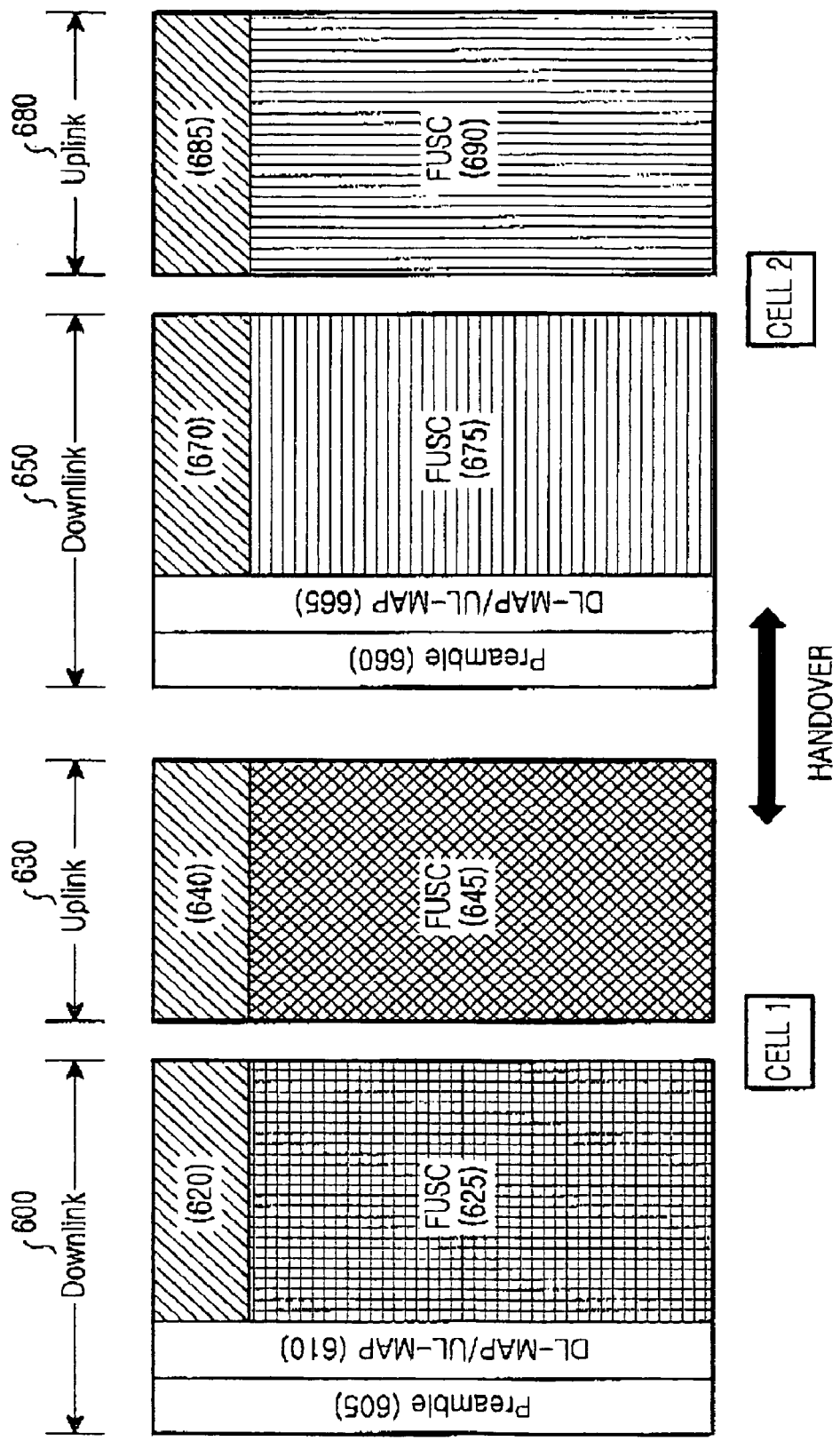
FIG. 6 is a diagram illustrating frame structures in a broadband wireless access communication system according to an embodiment of the present invention.

FIG. 6 is a diagram schematically illustrating frame structures of the IEEE 802.16e communication system which includes a structure of a soft handover subchannel allocated, in which an example for a sector's sub-carrier allocation using a downlink FUSC area and uplink FUSC area is shown.

Referring to FIG. 6, frame structure of two cells, i.e., cell #1 and cell #2, are shown with respect to the case in which an MS, in the course of a soft handover, communicates simultaneously with the cells #1 and #2.

In FIG. 6, the MS uses an FUSC subchannel allocated from cell #1 in cell #1. Thereafter, when the MS moves to a boundary area of cell #2, the MS performs a soft handover. During the soft handover, the MS uses an FUSC subchannel allocated from cell #2. In this case, both of cells #1 and #2 allocate the MS with the same FUSC subchannel of FUSC subchannels, which is identically assigned for a soft handover in all cells.

According to an embodiment of the present invention, in order to allocate an FUSC subchannel to the MS, all sectors select a subchannel area value (e.g., a required number '$N_{ho}$' of soft handover subchannels) required for a soft handover from among an FUSC subchannel area, use the same seed value to assign FUSC subchannels, and reserve the assigned FUSC subchannels in a required subchannel area. Also, each cell applies its own specific seed value to the sub-carriers of the remaining subchannel area, thereby configuring FUSC subchannels.

The frame structures of FIG. 6 for performing the function of the present invention described above will now be described in more detail.

The frame of cell #1 includes a downlink frame 600 and an uplink frame 630. The downlink frame 600 includes a preamble area 605, a DL-MAP/UL-MAP area 610, and FUSC areas 620 and 625. The FUSC areas 620 and 625 include a soft handover subchannel area 620 and a non-soft handover subchannel area 625.

The uplink frame 630 includes FUSC areas 640 and 645. The FUSC areas 640 and 645 include a soft handover subchannel area 640 and a non-soft handover subchannel area 645.

A synchronization signal (i.e., a preamble sequence) for acquiring synchronization between transmission/reception devices (i.e., between a base station and MSs) is transmitted through the preamble area 605. A DL-MAP message and a UL-MAP message are transmitted through the DL-MAP/UL-MAP area 610. Herein, the information elements (IEs) included in the DL-MAP and UL-MAP messages have no direct relation with the present invention, so detailed description thereof will be omitted.

The frame of cell #2 includes a downlink frame 650 and an uplink frame 680. The downlink frame 650 includes a preamble area 660, a DL-MAP/UL-MAP area 665, and FUSC areas 670 and 675. The FUSC areas 670 and 675 include a soft handover subchannel area 670 and a non-soft handover subchannel area 675.

The uplink frame 680 includes FUSC areas 685 and 690. The FUSC areas 685 and 690 include a soft handover subchannel area 685 and a non-soft handover subchannel area 690.

As shown in FIG. 6, two adjacent cells (i.e., cells #1 and #2) include soft handover subchannels 620, 640, 670 and 685 constituted with the same sub-carriers, and include non-soft handover subchannels 625, 645, 675 and 690 constituted with the different sub-carriers. Herein, the non-soft handover subchannels 625, 645, 675 and 690 refer to FUSC subchannels configured in permutations different from each other. Consequently, according to an embodiment of the present invention, the soft handover of an MS is supported through the soft handover subchannels 620, 640, 670 and 685 constituted with the same sub-carriers, and service for normal MSs not performing soft handovers is provided through the non-soft handover subchannels 625, 645, 675 and 690 constituted with the different sub-carriers, it is possible to minimize interference while supporting a soft handover.

The above-mentioned embodiment of the present invention provides new FUSC subchannel configuration schemes by newly configuring the soft handover subchannels and the non-soft handover subchannels. Hereinafter, a method for increasing backward compatibility of MSs, which do not support the above-mentioned FUSC subchannel configuration scheme based on the present invention, will be described according to another embodiment of the present invention.

To be specific, according to another embodiment of the present invention, a solution to the compatibility problem is provided by supporting FUSC subchannel configuration schemes used in the typical IEEE 802.16e communication system (i.e., the first to fourth FUSC subchannel configuration schemes described as the prior art) and simultaneously, supporting the FUSC subchannel configuration schemes newly-proposed according to an embodiment of the present invention (i.e., the fifth to eighth FUSC subchannel configuration schemes).

Figure 7:
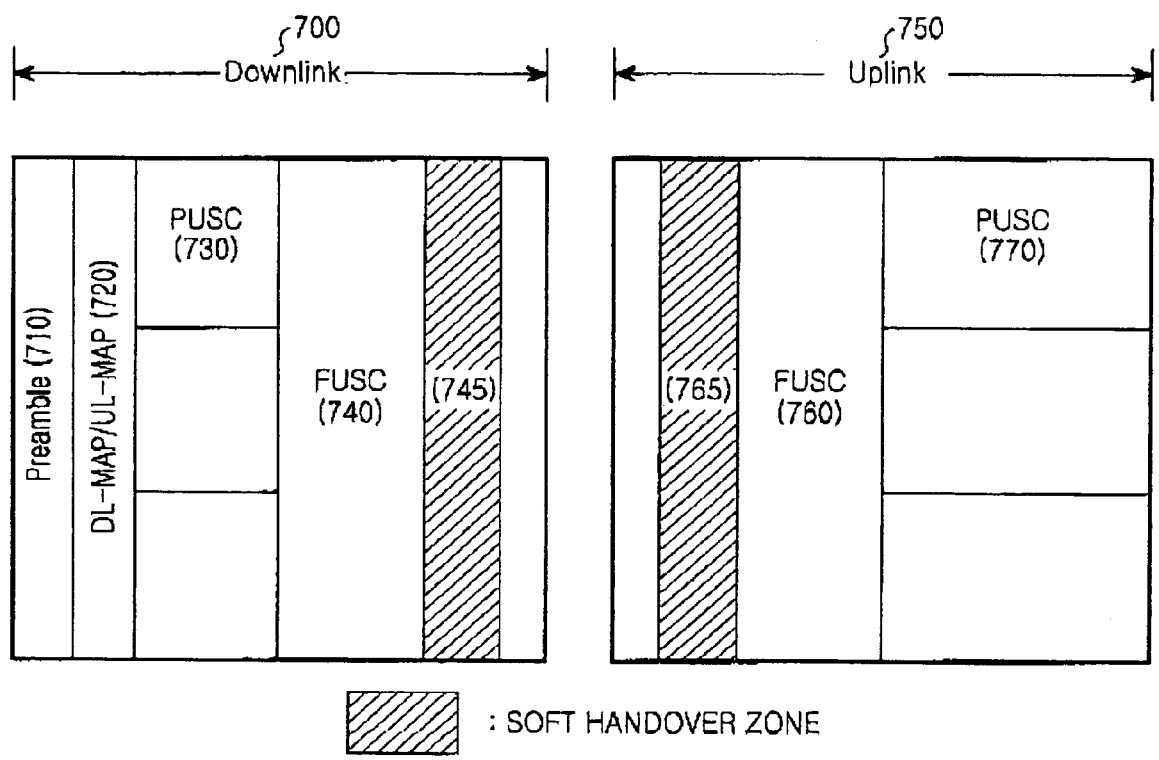
FIG. 7 is a diagram illustrating the frame structures in a broadband wireless access communication system according to another embodiment of the present invention.

FIG. 7 is a diagram illustrating the frame structures of the IEEE 802.16e communication system including the soft handover subchannel structures allocated according to another embodiment of the present invention. The frames shown in FIG. 7 include a downlink frame 700 and an uplink frame 750. The downlink frame 700 includes a preamble area 710, a DL-MAP/UL-MAP area 720, a partial-usage-of-subchannels (PUSC) area 730, and an FUSC area 740. The FUSC area 740 includes a soft handover zone 745 according to an embodiment of the present invention.

The uplink frame 750 includes an FUSC area 760 and a PUSC area 770. The FUSC area 760 includes a soft handover zone 765 according to an embodiment of the present invention.

The soft handover zone 745 for downlink and the soft handover zone 765 for uplink configure soft handover subchannels by using one of the fifth to eighth FUSC subchannel configuration schemes proposed according to an embodiment of the present invention.

Therefore, when an MS supporting the function according to an embodiment of the present invention performs a soft handover, a corresponding base station supports the soft handover by allocating the MS with a soft handover subchannel in the soft handover zones. In contrast, when the MS does not perform a soft handover, the base station allocates the MS with a subchannel except for the subchannels included in the soft handover zones. Also, the MS supporting the function according to an embodiment of the present invention operates through the non-soft handover zone and receives service through the remaining areas except for the soft handover zones, so that the compatibility problem can be solved.

As described above, the existing IEEE 802.16e communication system employs the first to fourth FUSC subchannel configuration schemes to allocate FUSC subchannels to MSs. Hereinafter, the operation of the base station in FIG. 7 according to another embodiment of the present invention will be described with reference to FIG. 8.

Figure 8:
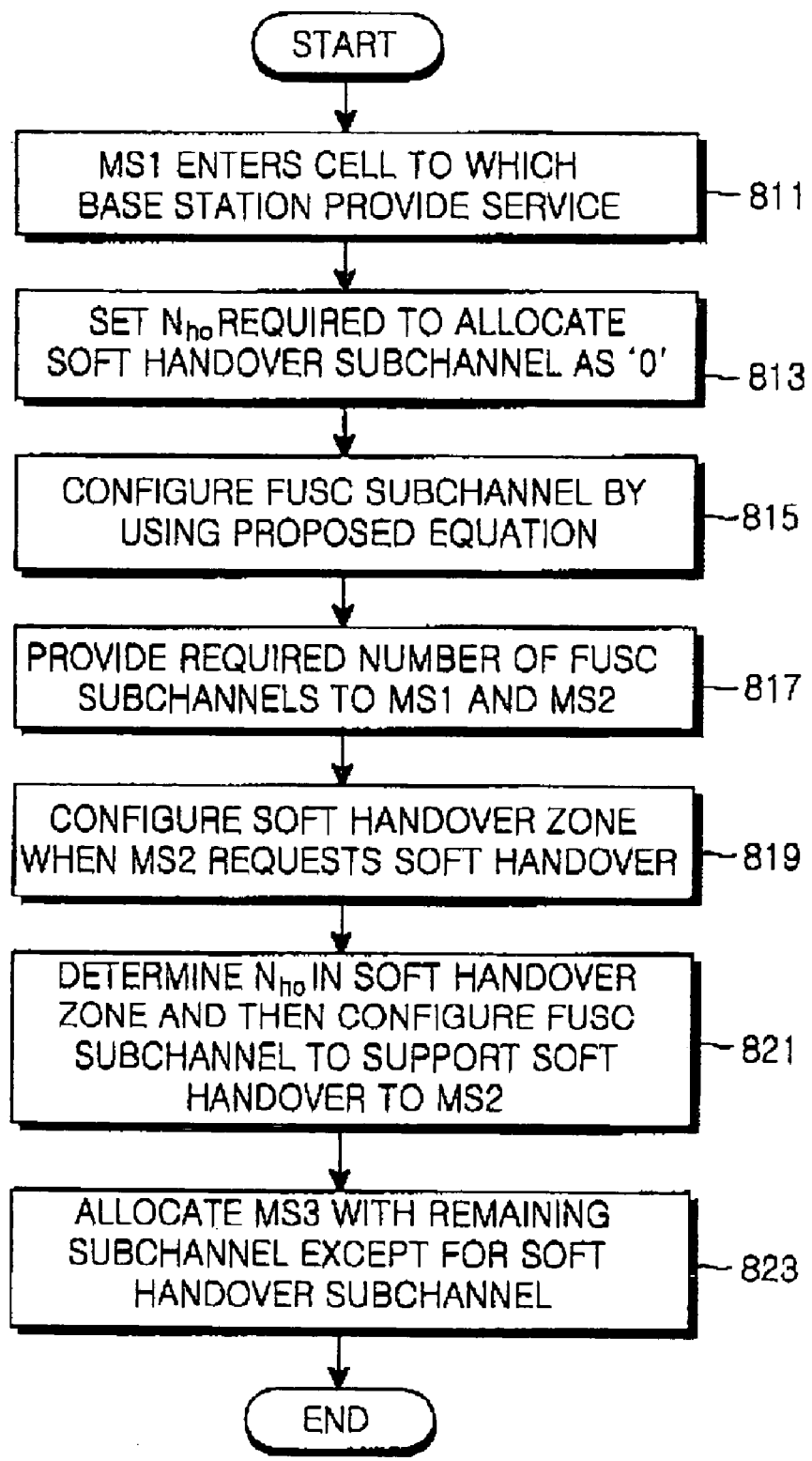
FIG. 8 is a flowchart for explaining an operation procedure of a base station in a broadband wireless access communication system according to an embodiment of the present invention.

FIG. 8 is a flowchart explaining an operation procedure of a base station in an IEEE 802.16e communication system according to another embodiment of the present invention, in which it is assumed that there are two base stations (i.e., first and second base stations) and three MSs (i.e., MS1, MS2 and MS3).

Also, it is assumed that the first base station is a base station not supporting the function according to the embodiments of the present invention, and the second base station is a base station for supporting the function according to the embodiments of the present invention. It is further assumed that the MS1 is an MS not supporting the function according to the embodiments of the present invention, and the MS2 and MS3 are MSs for supporting the function according to the embodiments of the present invention. In addition, it is assumed that there is no problem in providing service between the first and second base stations and MS1, MS2 and MS3.

Based on such assumptions, MS1, MS2 and MS3 receive service from the first base station, MS2 and MS3 set the number '$N_{ho}$' of soft handover subchannels required for a soft handover as '0' and receive a part of FUSC subchannels as the soft handover subchannels from the second base station. However, a problem occurs in the case in which MS1 receives service from the second base station. In order to solve the compatibility problem as described above, it is necessary to continuously provide service in this case also.

Such a problem can be solved by setting the soft handover zones in the downlink frame and the uplink frame as described with reference to FIG. 7. That is, by including separate soft handover zones in the downlink and uplink frames, an MS for supporting the function according to the embodiments of the present invention can use a subchannel which is allocated for a soft handover according to the fifth to eighth FUSC subchannel configuration schemes. In this case, an MS for supporting none of the fifth to eighth FUSC subchannel configuration schemes operates with no soft handover zone. That is, such an MS receives service through the remaining zone except for the soft handover zones. A method for using a soft handover zone according to another embodiment of the present invention will now be described.

Referring to FIG. 8, when MS 1 receives service in a cell to which the second base station provides service in step 811, the second base station sets the number '$N_{ho}$' of soft handover subchannels required for a soft handover as '0' in step 813, and then proceeds to step 815. In step 815, the second base station configures FUSC subchannels by using the value of its own specific cell ID and then proceeds to step 817.

In step 817, the second base station can provide service to all MSs (i.e., MS1, MS2 and MS3). A problem occurring in this case is that the soft handover, according to an embodiment of the present invention, is not supported. In order to solve such a problem, the soft handover zones are included in the downlink and uplink frames as described above. That is, in step 819, when one of the MS2 and MS3 requests a soft handover, the second base station performs an operation for locating a soft handover zone in the downlink and uplink frames. By such an operation, the second base station can support a soft handover to MS2 or MS3.

That is, in step 821, the second base station determines a proper number '$N_{ho}$' of soft handover subchannels when MS2 or MS3 requests the soft handover, configures FUSC subchannels by using one of the fifth to eighth FUSC subchannel configuration schemes, and then proceeds to step 823. In step 823, the second base station allocates MS2 or MS3 with a predetermined soft handover subchannel of a soft handover area configured as described above, and allocates an MS (e.g., MS3) for not requesting a soft handover with a subchannel of the remaining area.

The method according to the embodiments of the present invention can be applied to all MSs having the existing standard by applying the soft handover zone as described with reference to FIGS. 7 and 8.

Figure 9:
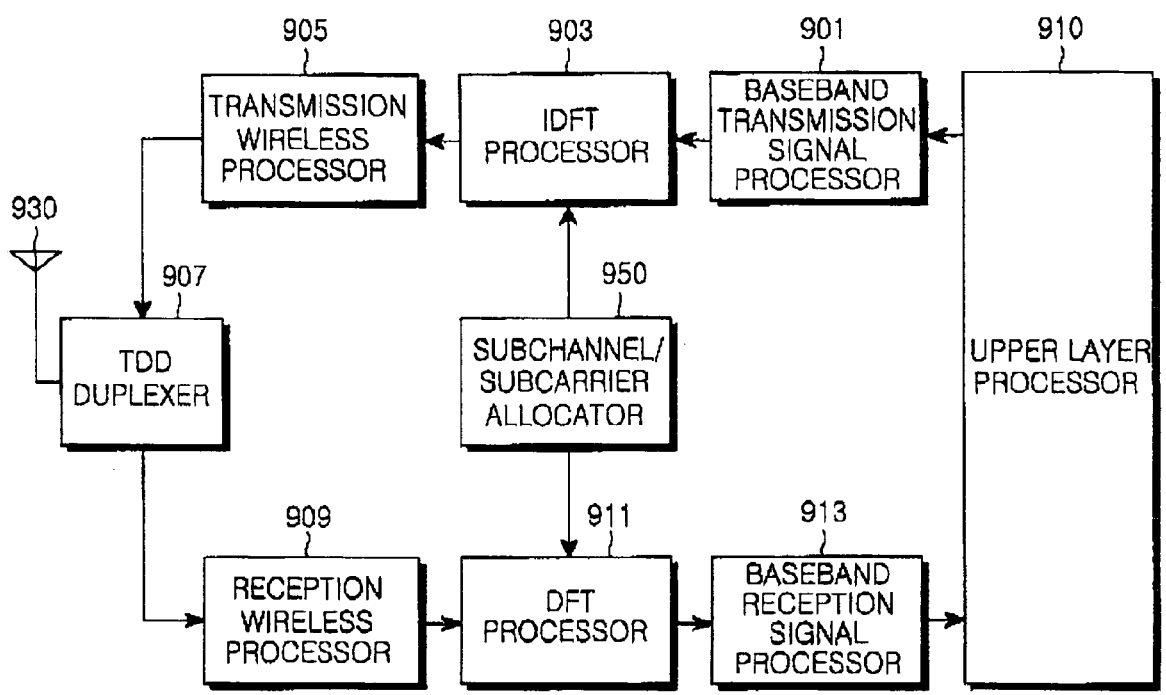
FIG. 9 is a block diagram illustrating a configuration of a base station apparatus for performing the function according to embodiments of the present invention.

FIG. 9 is a block diagram schematically illustrating a configuration of a transceiving apparatus for performing the function according to embodiments of the present invention.

The transceiving apparatus includes a transmission section and a reception section. The transmission section includes an upper layer processor 910, a baseband transmission signal processor 901, an inverse discrete Fourier transform (IDFT) processor 903, a transmission wireless processor 905, a time division duplexing (TDD) duplexer 907, an antenna 930, and a subchannel/subcarrier allocator 950. The reception section includes the antenna 930, the TDD duplexer 907, a reception wireless processor 909, a discrete Fourier transform (DFT) processor 911, a baseband reception signal processor 913, the upper layer processor 910, and the subchannel/subcarrier allocator 950.

In the transmission section of the transceiving apparatus, the baseband transmission signal processor 901 generates and outputs a transmission signal to the IDFT processor 903. The IDFT processor 903 receives the generated baseband transmission signal, performs IDFT with respect to the received transmission signal, and then outputs the IDFT-processed transmission signal to the transmission wireless processor 905. The transmission wireless processor 905 performs a wireless processing with respect to the IDFT-processed transmission signal, and then outputs the wirelessly-processed transmission signal to the TDD duplexer 907. The TDD duplexer 907 transmits the wirelessly-processed transmission signal through the antenna 930 over the air.

In the reception section of the transceiving apparatus, the TDD duplexer 907 receives a signal in a TDD scheme through the antenna 930. The TDD duplexer 907 outputs the received signal to the reception wireless processor 909. The reception wireless processor 909 receives the received signal, converts the received signal into a baseband signal, and then outputs the baseband signal to the DFT processor 911. The DFT processor 911 receives the baseband signal, performs DFT with respect to the baseband signal, and outputs the DFT-processed baseband signal to the baseband reception signal processor 913. The baseband reception signal processor 913 processes the DFT-processed baseband signal to restore a user signal.

Thereafter, the subchannel/subcarrier allocator 950 receives a control signal from the upper layer processor 910, and controls the selection of uplink/downlink subchannels (i.e., an uplink FUSC sub-channel and a downlink FUSC sub-channel) allocated to a relevant MSS. To be specific, the subchannel/subcarrier allocator 950 outputs information about the selected uplink FUSC subchannel to the IDFT processor 903. The IDFT processor 903 maps the generated baseband transmission signal on the selected uplink FUSC subchannel. Also, the subchannel/subcarrier allocator 950 outputs information about the selected downlink FUSC subchannel to the DFT processor 911. The DFT processor 911 extracts a baseband signal from the selected downlink FUSC sub-channel.

As described above, according to the embodiments of the present invention, the uplink/downlink FUSC subchannel configuration apparatus and method is provided to achieve a soft handover in an OFDMA communication system, and a method for mapping sub-carriers allocated to subchannels in configuring the uplink/downlink FUSC subchannels is provided in permutation patterns. In a soft handover using the method according to the present invention as described above, it is possible to decrease interference between adjacent cells, which is large in a system according to the prior art. Also, a soft handover using the method according to the present invention as described above can improve the quality of received signals in MSs located at a cell boundary. In addition, by providing a soft handover zone according to the embodiments of the present invention, it is possible to improve backward compatibility of the existing system.

While the present invention has been shown and described with reference to certain preferred embodiments thereof, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

What is claimed is:

1. A method for configuring a subchannel in a broadband wireless access communication system, which includes a plurality of cells distinguished by cell identifications and has an entire frequency band divided into a plurality of sub-carrier bands, said system further includes a subchannel/subcarrier allocator, which performs said method, the method comprising the steps of:

generating a plurality of subchannels based on a predetermined subchannel configuration scheme in each of the cells included in the communication system;

determining a predetermined number of subchannels from among the generated subchannels as soft handover subchannels;

renumbering indexes of sub-carrier bands included in remaining subchannels except for the subchannels determined as the soft handover subchannels; and generating a plurality of non-soft handover subchannels including different sub-carrier bands depending on the cells, by using a specific cell identification of each cell and the renumbered indexes of sub-carrier bands, wherein the subchannel configuration scheme is determined by:

$$\text{subcarrier}(k, s) = (N_{subch} - N_{ho})n_k + \{P_s[n_k \bmod (N_{subch} - N_{ho})] + ID_{cell}\} \bmod (N_{subch} - N_{ho}),$$

and wherein 'subcarrier (k,s)' represents an index of a $k^{th}$ sub-carrier in a $s^{th}$ subchannel, '$N_{subch}$' represents the number of subchannels, '$ID_{cell}$' represents a base station ID for a corresponding cell, '$N_{ho}$' represents a required number of soft handover subchannels, '$N_{tones}$' represents the number of sub-carriers for configuring one subchannel, $n_k=(k+13s) \bmod N_{tones}$, and '$p_s[i]$' represents a value of an $i^{th}$ element obtained through an 's' times leftward cyclic-shift of $\tilde{p}$.

2. The method as claimed in claim 1, wherein $\tilde{p}$ is equal to 'p' when the required number '$N_{ho}$' of soft handover subchannels is 'zero', and $\tilde{p}$ represents a permutation obtained by removing elements corresponding to '$N_{subch}-N_{ho}$', '$N_{subch}+1-N_{ho}$', '$N_{subch}+2-N_{ho}$', ..., and '$N_{subch}-1$' from among the elements included in 'p' when the required number '$N_{ho}$' of soft handover subchannels excceds 'zero', which is expressed as:

$$\tilde{p} = \begin{cases} p & \text{if } N_{ho} = 0 \\ \begin{Bmatrix} x \mid x \in p, x \neq N_{subch} - (N_{ho} - i), \\ i = 0, 1, \ldots, N_{ho} - 1 \end{Bmatrix} & \text{if } N_{ho} \geq 1 \end{cases}.$$

3. A method for configuring a subchannel in a broadband wireless access communication system, which includes a plurality of cells distinguished by cell identifications and has an entire frequency band divided into a plurality of sub-carrier bands, said system further includes a subchannel/subcarrier allocator, which performs said method, the method comprising the steps of:

generating a plurality of subchannels based on a predetermined subchannel configuration scheme in each of the cells included in the communication system;

determining a predetermined number of subchannels from among the generated subchannels as soft handover subchannels;

renumbering indexes of sub-carrier bands included in remaining subchannels except for the subchannels determined as the soft handover subchannels; and generating a plurality of non-soft handover subchannels including different sub-carrier bands depending on the cells, by using a specific cell identification of each cell and the renumbered indexes of sub-carrier bands, wherein the subchannel configuration scheme is determined by:

$$\text{subcarrier}(m, s) = \begin{cases} (N_{subch} - N_{ho})k + s \oplus P_{1,c1}(k') \oplus P_{2,c2}(k') & 0 < c_1, c_2 < (N_{subch} - N_{ho}) \\ (N_{subch} - N_{ho})k + s \oplus P_{1,c1}(k') & c_1 \neq 0, c_2 = 0 \\ (N_{subch} - N_{ho})k + s \oplus P_{2,c2}(k') & c_1 = 0, c_2 \neq 0 \\ 32k + s & c_1 = 0, c_2 = 0 \end{cases},$$

and wherein '$p_{1,c1}[i]$' represents a value of an ith element obtained through a 'c1' times leftward cyclic-shift of 'p1', and '$p_{2,c2}[i]$' represents a value of an $i^{th}$ element obtained through a 'c2' times leftward cyclic-shift of '$p_2$', which are expressed as:

$$p_1 = \begin{cases} p_{1,base} & \text{if } N_{ho} = 0 \\ \left\{ \begin{array}{l} x \mid x \in p_{1,base}, x \neq N_{subch} - (N_{ho} - i), \\ i = 0, 1, \dots, N_{ho} - 1 \end{array} \right\} & \text{if } N_{ho} \geq 1 \end{cases}, \text{ and}$$

$$p_2 = \begin{cases} p_{2,base} & \text{if } N_{ho} = 0 \\ \left\{ \begin{array}{l} x \mid x \in p_{2,base}, x \neq N_{subch} - (N_{ho} - i), \\ i = 0, 1, \dots, N_{ho} - 1 \end{array} \right\} & \text{if } N_{ho} \geq 1 \end{cases}.$$

4. A method for configuring a subchannel in a broadband wireless access communication system, which includes a plurality of cells distinguished by cell identifications and has an entire frequency band divided into a plurality of sub-carrier bands, said system further includes a subchannel/subcarrier allocator, which performs said method, the method comprising the steps of:

generating a plurality of subchannels based on a predetermined subchannel configuration scheme in each of the cells included in the communication system;

determining a predetermined number of subchannels from among the generated subchannels as soft handover subchannels;

renumbering indexes of sub-carrier bands included in remaining subchannels except for the subchannels determined as the soft handover subchannels; and generating a plurality of non-soft handover subchannels including different sub-carrier bands depending on the cells, by using a specific cell identification of each cell and the renumbered indexes of sub-carrier bands, wherein the subchannel configuration scheme is determined by:

$$\text{tile}(n,s) = (N_{subch} - N_{ho})n \{p[(s+n) \mod (N_{subch} - N_{ho})] + UL_{cell}\} \mod (N_{subch} - N_{ho})$$

wherein, 'tile(n,s)' represents an $n^{th}$ tile index of an $s^{th}$ subchannel, '$UL_{cell}$' represents a value which is determined in a MAC layer, '$N_{ho}$' represents a required number of soft handover subchannels, '$N_{subch}$' represents the number of FUSC subchannels, and 'p' is determined by:

$$p = \begin{cases} p_0 & \text{if } N_{ho} = 0 \\ \left\{ \begin{array}{l} x \mid x \in p_0, x \neq N_{subch} - (N_{ho} - i), \\ i = 0, 1, \dots, N_{ho} - 1 \end{array} \right\} & \text{if } N_{ho} \geq 1 \end{cases}.$$

5. A method for configuring a subchannel in a broadband wireless access communication system, which includes a plurality of cells distinguished by cell identifications and has an entire frequency band divided into a plurality of sub-carrier bands, said system further includes a subchannel/subcarrier allocator, which performs said method, the method comprising the steps of:

generating a plurality of subchannels based on a predetermined subchannel configuration scheme in each of the cells included in the communication system;

determining a predetermined number of subchannels from among the generated subchannels as soft handover subchannels;

renumbering indexes of sub-carrier bands included in remaining subchannels except for the subchannels determined as the soft handover subchannels; and generating a plurality of non-soft handover subchannels including different sub-carrier bands depending on the cells, by using a specific cell identification of each cell and the renumbered indexes of sub-carrier bands, wherein the subchannel configuration scheme is determined by:

$$\text{tile}(m, s) = \begin{cases} (3N_t - N_{ho})m + N_t S + s' \oplus P_{1,c1}[m'] \oplus P_{2,c2}[m'] & 0 < c_1, c_2 < N_t \\ (3N_t - N_{ho})m + N_t S + s' \oplus P_{1,c1}[m'] & c_1 \neq 0, c_2 = 0 \\ (3N_t - N_{ho})m + N_t S + s' \oplus P_{2,c2}[m'] & c_1 = 0, c_2 \neq 0 \\ (3N_t - N_{ho})m + N_t S + s' & c_1 = 0, c_2 = 0 \end{cases},$$

wherein '$N_t$' represents the number of tiles included in one group, 'm' represents an $m^{th}$ tile included in one subchannel, '$p_{1,c1}[i]$' represents a value of an $i^{th}$ element obtained through a 'c1' times leftward cyclic-shift of '$p_1$', and '$p_{2,c2}[i]$' represents a value of an $i^{th}$ element obtained a 'c2' times leftward cyclic-shift of '$p_2$'.

6. An apparatus for configuring a subchannel for a soft handover in a broadband wireless access (BWA) communication system, the apparatus comprising:

a subchannel/subcarrier allocator for receiving a control signal from an upper layer and controlling the selection of downlink/uplink full-usage-of-subchannels (FUSC) subchannels to be allocated to a corresponding mobile station, wherein the subchannel/subcarrier allocator generates a plurality of subchannels based on a predetermined subchannel configuration scheme in each of the cells included in the communication system, determines a predetermined number of sub-channels from among the generated subchannels as soft handover subchannels, renumbers indexes of sub-carrier bands included in remaining subchannels except for the subchannels determined as the soft handover subchannels including different sub-carrier bands depending on the cells, by using a specific cell identification of each cell and the renumbered indexes of sub-carrier bands, wherein the subchannel configuration scheme is determined by:

subcarrier$(k, s) = (N_{subch} - N_{ho})n_k +$ $\{P_s[n_k \bmod (N_{subch} - N_{ho})] + ID_{cell}\} \bmod (N_{subch} - N_{ho})$, and wherein 'subcarrier (k,s)' represents an index of a $k^{th}$ sub-carrier in an $s^{th}$ subchannel, '$N_{subch}$' represents the number of subchannels, '$ID_{cell}$' represents a base station ID for a corresponding cell, '$N_{ho}$' represents a required number of soft handover subchannels, '$N_{tones}$' represents the number of sub-carriers for configuring one subchannel, $n_k=(k+13s) \bmod N_{tones}$, and '$p_s[i]$' represents a value of an $i^{th}$ element obtained through an 's' times leftward cyclic-shift of P.

7. The apparatus as claimed in claim 6, wherein P is equal to 'p' when the required number '$N_{ho}$' of soft handover subchannels is 'zero', and P represents a permutation obtained by removing elements corresponding to '$N_{subch}-N_{ho}$', '$N_{subch}+1-N_{ho}$', '$N_{subch}+2-N_{ho}$', ..., and '$N_{subch}-1$' from among the elements included in 'p' when the required number '$N_{ho}$' of soft handover subchannels exceeds 'zero', which is expressed as:

$$p = \begin{cases} p_0 & \text{if } N_{ho} = 0 \\ \{x \mid x \in p_0, x \neq N_{subch} - (N_{ho} - i), \\ i = 0, 1, \ldots, N_{ho} - 1 \} & \text{if } N_{ho} \geq 1 \end{cases}.$$

8. An apparatus for configuring a subchannel for a soft handover in a broadband wireless access communication system, the apparatus comprising:

a subchannel/subcarrier allocator for receiving a control signal from an upper layer and controlling selection of downlink/uplink subchannels to be allocated to a corresponding mobile station, wherein the subchannel/subcarrier allocator generates a plurality of subchannels based on a predetermined subchannel configuration scheme in each of the cells included in the communication system, determines a predetermined number of subchannels from among the generated subchannels as soft handover subchannels, renumbers indexes of sub-carrier bands included in remaining subchannels except for the subchannels determined as the soft handover subchannels, and generates a plurality of non-soft handover subchannels including different sub-carrier bands depending on the cells, by using a specific cell identification of each cell and the renumbered indexes of sub-carrier bands, wherein the subchannel configuration scheme is determined by:

subcarrier$(m, s) =$ $$\begin{cases} (N_{subch} - N_{ho})k + s \oplus P_{1,c1}(k') \oplus P_{2,c2}(k') & 0 < c_1, c_2 < (N_{subch} - N_{ho}) \\ (N_{subch} - N_{ho})k + s \oplus P_{1,c1}(k') & c_1 \neq 0, c_2 = 0 \\ (N_{subch} - N_{ho})k + s \oplus P_{2,c2}(k') & c_1 = 0, c_2 \neq 0 \\ 32k + s & c_1 = 0, c_2 = 0 \end{cases},$$

and wherein '$P_{1,c1}[i]$' represents a value of an $i^{th}$ element obtained through a 'c1' times leftward cyclic-shift of '$p_1$', and '$P_{2,c2}[i]$' represents a value of an $i^{th}$ element obtained through a 'c2' times leftward cyclic-shift of '$p_2$', which are expressed as:

$$p_1 = \begin{cases} p_{1,base} & \text{if } N_{ho} = 0 \\ \{x \mid x \in p_{1,base}, x \neq N_{subch} - (N_{ho} - i), \\ i = 0, 1, \ldots, N_{ho} - 1 \} & \text{if } N_{ho} \geq 1 \end{cases}, \text{and}$$

$$p_2 = \begin{cases} p_{2,base} & \text{if } N_{ho} = 0 \\ \{x \mid x \in p_{2,base}, x \neq N_{subch} - (N_{ho} - i), \\ i = 0, 1, \ldots, N_{ho} - 1 \} & \text{if } N_{ho} \geq 1 \end{cases}.$$

9. An apparatus for configuring a subchannel for a soft handover in a broadband wireless access communication system, the apparatus comprising:

a subchannel/subcarrier allocator for receiving a control signal from an upper layer and controlling selection of downlink/uplink subchannels to be allocated to a corresponding mobile station, wherein the subchannel/subcarrier allocator generates a plurality of subchannels based on a predetermined subchannel configuration scheme in each of the cells included in the communication system, determines a predetermined number of subchannels from among the generated subchannels as soft handover subchannels, renumbers indexes of sub-carrier bands included in remaining subchannels except for the subchannels determined as the soft handover subchannels, and generates a plurality of non-soft handover subchannels including different sub-carrier bands depending on the cells, by using a specific cell identification of each cell and the renumbered indexes of sub-carrier bands, wherein the subchannel configuration scheme is determined by:

tile$(n,s)=(N_{subch}-N_{ho})n +\{p[(s+n) \bmod(N_{subch}-N_{ho})]+ UL_{cell}\} \bmod(N_{subch}-N_{ho})$ wherein, 'tile(n,s)' represents an $n^{th}$ tile index of an $s^{th}$ subchannel, '$UL_{cell}$' represents a value is determined in a MAC layer, '$N_{ho}$' represents a required number of soft handover subchannels, '$N_{subch}$' represents the number of Full-Usage-of-SubChannels (FUSC) subchannels, and 'p' is determined by:

$$p = \begin{cases} p_0 & \text{if } N_{ho} = 0 \\ \{x \mid x \in p_0, x \neq N_{subch} - (N_{ho} - i), \\ i = 0, 1, \ldots, N_{ho} - 1 \} & \text{if } N_{ho} \geq 1 \end{cases}.$$

10. An apparatus for configuring a subchannel for a soft handover in a broadband wireless access communication system, the apparatus comprising:

a subchannel/subcarrier allocator for receiving a control signal from an upper layer and controlling selection of downlink/uplink subchannels to be allocated to a corresponding mobile station, wherein the subchannel/subcarrier allocator generates a plurality of subchannels based on a predetermined subchannel configuration scheme in each of the cells included in the communication system, determines a predetermined number of subchannels from among the generated subchannels as soft handover subchannels, renumbers indexes of sub-carrier bands included in remaining subchannels except for the subchannels determined as the soft handover subchannels, and generates a plurality of non-soft handover subchannels including different sub-carrier bands depending on the cells, by using a specific cell identification of each cell and the renumbered indexes of sub-carrier bands, wherein the subchannel configuration scheme is determined by an equation:

$$\text{tile}(m, s) = \begin{cases} (3N_t - N_{ho})m + N_t S + s' \oplus P_{1,c1}[m'] \oplus P_{2,c2}[m'] & 0 < c_1, c_2 < N_t \\ (3N_t - N_{ho})m + N_t S + s' \oplus P_{1,c1}[m'] & c_1 \neq 0, c_2 = 0 \\ (3N_t - N_{ho})m + N_t S + s' \oplus P_{2,c2}[m'] & c_1 = 0, c_2 \neq 0 \\ (3N_t - N_{ho})m + N_t S + s' & c_1 = 0, c_2 = 0 \end{cases}, \quad 5$$

wherein '$N_t$' represents the number of tiles included in one group, 'm' represents an $m^{th}$ tile included in one sub-channel, '$P_{1,c1}[i]$' represents a value of an $i^{th}$ element obtained through a 'c1' times leftward cyclic-shift of '$p_1$' and '$P_{2,c2}[i]$' represents a value of an $i^{th}$ element obtained a 'c2' times leftward cyclic-shift of '$p_2$'.

* * * * *